(12) United States Patent　　(10) Patent No.: US 8,912,114 B2
Mukerjee　　(45) Date of Patent: Dec. 16, 2014

(54) PLATINUM ALLOY ELECTROCATALYST WITH ENHANCED RESISTANCE TO ANION POISONING FOR LOW AND MEDIUM TEMPERATURE FUEL CELLS

(75) Inventor: Sanjeev Mukerjee, Mansfield, MA (US)

(73) Assignee: Northeastern University, Boston, MA (US)

( * ) Notice: Subject to any disclaimer, the term of this patent is extended or adjusted under 35 U.S.C. 154(b) by 685 days.

(21) Appl. No.: 13/119,937

(22) PCT Filed: Sep. 18, 2009

(86) PCT No.: PCT/US2009/057518
§ 371 (c)(1),
(2), (4) Date: Mar. 18, 2011

(87) PCT Pub. No.: WO2010/033829
PCT Pub. Date: Mar. 25, 2010

(65) Prior Publication Data
US 2011/0207019 A1　　Aug. 25, 2011

Related U.S. Application Data

(60) Provisional application No. 61/192,409, filed on Sep. 18, 2008.

(51) Int. Cl.
*B01J 21/18*　　(2006.01)
*B01J 23/00*　　(2006.01)
*B01J 23/40*　　(2006.01)
*B01J 23/74*　　(2006.01)
*H01M 4/92*　　(2006.01)
*H01M 8/08*　　(2006.01)
*H01M 8/10*　　(2006.01)

(52) U.S. Cl.
CPC ............... *H01M 4/921* (2013.01); *Y02E 60/50* (2013.01); *H01M 4/926* (2013.01); *H01M 8/086* (2013.01); *H01M 2008/1095* (2013.01)
USPC .......................................... 502/185; 502/182

(58) Field of Classification Search
USPC .................................................. 502/182, 185
See application file for complete search history.

(56) References Cited

U.S. PATENT DOCUMENTS 7,205,255 B2 *　4/2007　Yamamoto ................... 502/101
7,244,688 B2　　7/2007　Reetz et al.
2004/0197638 A1　10/2004　McElrath et al.
(Continued)

FOREIGN PATENT DOCUMENTS

WO　WO 2010/139596 A2　12/2010

OTHER PUBLICATIONS

Lim et al., "Preparation of platinum nanoparticles on carbon black with mixed binary surfactants: Characterization and evaluation as anode catalyst for low-temperature fuel cell," *Journal of Power Sources*, vol. 185, Issue 1, Jul. 2008, p. 160, ¶ [0003].

(Continued)

*Primary Examiner* — Patricia L Hailey
(74) *Attorney, Agent, or Firm* — McLane, Graf, Raulerson & Middleton, PA

(57) ABSTRACT

A platinum alloy catalyst is made by a microemulsion method. The resulting catalyst has superior properties for use in low and medium temperature fuel cells.

17 Claims, 19 Drawing Sheets

(56) References Cited

U.S. PATENT DOCUMENTS

2005/0233146 A1 10/2005 Nonninger
2007/0231620 A1 10/2007 Oonuma
2007/0270305 A1 11/2007 Pak et al.

OTHER PUBLICATIONS

Qian et al., "PtM/C Catalyst Prepared Using Reverse Micelle Method for Oxygen Reduction Reaction in PEM Fuel Cells," *J. Phys. Chem. C* 2008, vol. 112, pp. 1146-1157.

* cited by examiner

PLATINUM ALLOY ELECTROCATALYST WITH ENHANCED RESISTANCE TO ANION POISONING FOR LOW AND MEDIUM TEMPERATURE FUEL CELLS

CROSS REFERENCE TO RELATED APPLICATIONS

This application is a national stage filing under 35 U.S.C. §371 of international application PCT/US2009/057518, filed Sep. 18, 2009, English, and claims the priority of U.S. Provisional Application No. 61/192,409 filed Sep. 18, 2008 entitled, DEVELOPMENT OF NOVEL PT ALLOW ELECTROCATALYSTS WITH ENHANCED RESISTANCE TO ANION POISONING IN LOW AND MEDIUM TEMPERATURE FUEL CELLS, the whole of which are hereby incorporated by reference herein in their entireties.

STATEMENT REGARDING FEDERALLY SPONSORED RESEARCH

The research leading to this invention was carried out with U.S. Government support provided under grants from Army Research Office Grant No. 41553-CH and 55036-CH. The U.S. Government has certain rights in the invention.

BACKGROUND OF THE INVENTION

Proton exchange membrane (PEM) fuel cells are useful due to their high energy density, high efficiency, relatively low operating temperature and low emission of pollutants.[1] However, low performance of the oxygen reduction reaction (ORR) at the cathode is a principle obstacle to the successful application of PEM fuel cells, particularly in transportation. Various Pt based alloy catalysts[2-8] have been developed and show enhanced catalytic activity compared to Pt/C towards oxygen reduction reaction in PEM fuel cells, and also in phosphoric acid fuel cells that operate at higher temperatures. Nevertheless, in most of the methods[9-11] for preparation of carbon supported Pt-based alloy catalysts, high temperature (e.g., over 900° C.) is required to form the alloy, resulting in a lower catalyst active area.[9] Another disadvantage of such methods is that the Pt and other transition metals may deposit separately on the carbon support, rather than in close association.

The enhancement of ORR electrocatalytic activity in lower temperature PEM fuel system was reported[17-19] based on an investigation of a series of five binary alloys with Pt using the first row transition elements ranging from Cr to Ni. These results have been summarized in several reviews.[20,21] Further confirmation of enhancement in activity for ORR in PEM has been reported using supported Pt alloy electrocatalysts in a PEM fuel cell[22,23]. The role of alloying element in engendering enhancement of ORR catalytic activity in Pt based alloy catalysts has been ascribed to a decrease of the desorption free energy ($\Delta G_{ads}$) of oxide species on Pt, particularly OH.

There remains a need to develop new synthetic methods for making carbon-supported platinum alloys with predictable and controllable crystal structure and surface composition so as to improve the performance of cathodic catalysts and the kinetics of ORR in PEM fuel cells.

SUMMARY OF THE INVENTION

The invention provides a catalyst for use in electrochemical applications. The catalyst is made from nanoparticles containing an alloy of platinum and one or more transition metals. The method includes reducing platinum and the transition metals in the presence of a surfactant, i.e., in a micellar environment. The resulting nanoparticles then can be attached to carbon particles and used, for example, as a coating material for preparing a fuel cell cathode. The platinum alloy catalyst of the invention is uniform in size and monodisperse, resulting in superior electrochemical properties for use in low and medium temperature fuel cells, such as phosphoric acid fuel cells.

One aspect of the invention is a method of making a nanoparticulate platinum alloy catalyst. The method includes: (a) providing a complex of platinum and a complex of a transition metal in an aqueous solution; (b) injecting an aliquot of the aqueous solution into a nonpolar solvent to form an emulsion; (c) adding a reducing agent to the emulsion, whereby the platinum and transition metal become reduced and form a colloidal sol comprising nanoparticles of platinum alloy; (d) adding a surfactant to the colloidal sol after step (c); whereby the surfactant encapsulates the nanoparticles; (e) adding particulate carbon to the colloidal sol after step (d); and (f) breaking the micelles by adding a polar solvent miscible with the nonpolar solvent, whereby the platinum alloy nanoparticles adhere to the carbon particles to form a nanoparticulate platinum alloy catalyst. Another aspect of the invention is a catalyst made by this method. Still another aspect of the invention is a fuel cell containing a catalyst made by this method. The fuel cell can be, for example, a proton exchange membrane fuel cell or a phosphoric acid fuel cell.

Yet another aspect of the invention is a method of making an electrode. The method includes: (a) providing a suspension of a catalyst produced by the above described method in a polar solvent to form a catalyst ink; (b) dispersing the ink on an electrically conductive substrate and evaporating the solvent to leave a film of dried catalyst particles on the substrate; and (c) covering the film of catalyst particles with a binder film. A further aspect of the invention is a fuel cell electrode, such as a cathode, prepared by this method.

BRIEF DESCRIPTION OF THE DRAWINGS

FIG. 2 (b) shows a transmission electron micrograph of PtCo/C-T and the size distribution of the platinum nanoparticles.

FIG. 6 (b) shows Koutecky-Levich plots at different potentials for ORR in the cathodic sweep on PtCo/C—S in $O_2$-saturated 1M $HClO_4$ at room temperature. Scan rate: 20 mV s$^{-1}$.

FIG. 8 (b) shows specific activity of PtCo/C catalysts made by the microemulsion method and Pt/C (E-TEK) towards ORR at different potentials.

FIG. 11 (b) shows cyclic voltammograms obtained for Pt/C (E-TEK), PtCo/C-T, PtCo/C-TH, PtCo/C-TB, and ketjen carbon in 1.0 mol L$^{-1}$ KOH at 50 mV s$^{-1}$.

DETAILED DESCRIPTION OF THE INVENTION

Figure 1:
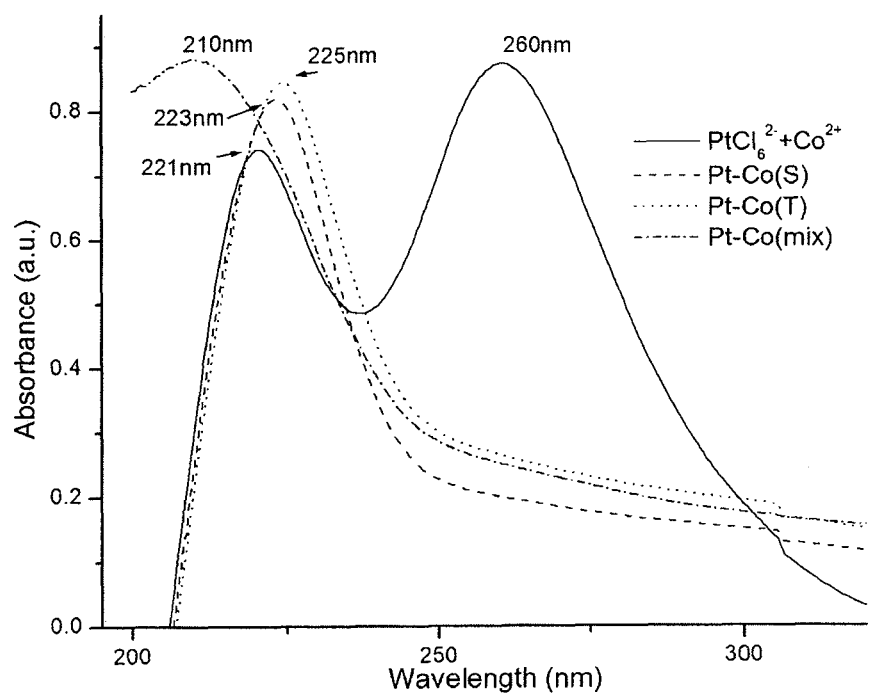
FIG. 1 shows UV-vis absorption spectra of microemulsions containing $PtCl_6^{2-}$, $Co^{2+}$, and PtCo nanoparticles made by both the simultaneous and sequential procedures; physical mixture of Pt and Co.

The invention relates to a method of preparing a platinum alloy catalyst with improved properties for use in low and medium temperature fuel cells. The method is based on reduction of platinum and one or more other transition metals in a reverse micellar environment followed by its dispersal among carbon black particles.

Carbon-supported platinum is used as a catalyst in gas-diffusion electrodes and catalyst-coated membrane structures for fuel cells, as well as for electrolysis and in sensor applications. It is usually desirable to alloy platinum with other transition metals and to deposit the alloy onto a carbon support to form an electrode for fuel cells. Platinum alloys with nickel, chromium, vanadium, cobalt, manganese, or iron usually display superior activity in oxygen reduction reactions of fuel cells. Such alloys offer high activity and are also less easily poisoned by contaminants from the fuel than simple platinum catalysts.

In contrast to previous methods of preparing platinum alloy catalysts for fuel cells, where platinum and other metals are reduced in aqueous solution or precipitated onto a carbon carrier, the present invention utilizes a reverse micelle environment for preparing the catalyst. The present approach results in nanometer scale metal particles (i.e., nanoparticles having an average size in the range from about 1 to about 1000 nm, preferably from about 1 to about 10 nm or from about 2 to about 20 nm which are uniformly dispersed (i.e., not aggregated) and have a narrow size distribution.

The catalyst according to the invention contains platinum together with one or more other transition metals. Suitable transition metals that can be alloyed with platinum include cobalt, nickel, chromium, vanadium, manganese, and iron.

In order to form a platinum alloy catalyst by a micellar process, it is necessary to form nanoparticles containing an alloy of platinum and a transition metal. This is carried out using a microemulsion containing droplets of a polar phase, composed of one or more polar solvents in a nonpolar phase composed of one or more nonpolar solvents. Any nonpolar solvent can be used that permits formation of a microemulsion with the polar solvent. Suitable polar solvents include water and short chain alcohols, while suitable nonpolar solvents include cyclohexane, hexane, toluene, 1-methyl-2-pyrrolidone, and ethers. The polar and non-polar solvents are selected such that the polar and non-polar phases are immiscible and form a microemulsion, with small droplets of the polar phase suspended in the nonpolar phase. The size of the droplets can be adjusted by selecting or manipulating the surface tension of the droplets, or by mechanically dispersing the polar phase in the nonpolar solvent, such as by sonication or rapid mixing. Preferably, the droplets have a size in the nanometer range, such as from about 10 nm to about 1000 nm, or extending into the micrometer range, such as up to 100 μm in diameter. The size of the droplets can influence the size of the resulting catalyst particles by determining the size of the pool of metal atoms available to form a single nanoparticle. The metal compounds that form the alloy can be present in covalent, ionic or complexed form. The metals are induced to form metallic nanoparticles by reduction, through the addition of a reducing agent to the microemulsion. The reduction reaction can be supported by adjusting the conditions as appropriate, such as by raising the temperature of the microemulsion or adding agents to adjust the pH to a desired range.

A platinum compound, such as one or more salts or complexes soluble in the polar phase, and one or more compounds containing other transition metals are injected or otherwise mixed into the nonpolar phase to form the microemulsion. Injection conditions are selected so as to achieve a uniform population of microdroplets. For example, the polar phase containing the metal compounds can be added during sonication or mixing. The polar phase assumes the form of small pools or microdroplets containing the metal compounds, and the droplets are suspended in the nonpolar phase to form the microemulsion. Suitable metal salts or complexes include chlorides, nitrates. In some embodiments the platinum and/or other transition metal is supplied as a metal-organic complex, such as a carbonyl complex. The metal-organic complex can be formed by liganding the metal ion to any of a variety of organic compounds including olefins, such as dimethyloctadiene; aromatics, such as pyridine; 2,4-pentanedione; or acetyl acetonate. The use of acetyl acetonate is preferred, as this compound can be thermally decomposed during heat activation of the catalyst, leaving a pure catalyst with high performance. Both organic and inorganic compounds containing platinum and other transition metals as described above can be obtained commercially; monohydrate and other hydrated forms are preferred.

Either before or after reduction of the metals, one or more appropriate surfactants can be added to form reverse micelles, i.e., surfactant-coated polar phase microdroplets suspended in the nonpolar phase. The surfactant protects the reductant, usually zero valent metal, from sintering. Suitable surfactants and co-surfactants include sodium dioctyl sulfosuccinate, 1-butanol, aliphatic acetic acid moieties. Surfactant can be added to the polar phase before it is added to the nonpolar phase, or surfactant can be added to an already formed microemulsion to form the reverse micelles.

A reducing agent is added to the microemulsion to reduce platinum and the alloying metal(s) to metallic form. In some embodiments the platinum and other metal(s) are reduced simultaneously, i.e., in the presence of one another, forming a uniform conglomerate of the metals. In other embodiments the metals are reduced sequentially, forming a core particle of one metal (e.g., platinum) coated with one or more other metals concentrated at the particle surface, or forming sequential layers of different metals. Suitable reducing agents include glacial acetic acid and sodium borohydrate. The product of reduction is a colloidal sol containing a platinum alloy in nanoparticulate form, where the nanoparticles of metal alloy are coated or encapsulated with one or more surfactants. Further details of reverse micelle methods for synthesizing platinum alloy catalysts can be found in Qian et al., J. Phys. Chem. C (2008), 112, 1146-1157, which is hereby incorporated by reference.

Formation of the micellar structure and reduction can be conducted at room temperature. Subsequent incorporation of the platinum alloy nanoparticles with carbon also can be carried out at or near room temperature. Adherence of the catalyst to a carbon support is carried out using a protocol to break the micelles in the presence of the carbon support particles. This is conducted with an appropriate addition of solvents such as acetone, dimethyl formamide, or dimethyl acetate, which disrupt the micelle structure. This is subsequently followed with a careful washing (e.g., using deionized water) and heat treatment step. The heat treatment typically utilizes a step and plateau profile with ramps of, for example, 5 to 50° C./hr, covering a temperature range from about 150 to about 1000° C. and including one or more plateaus of 30 to 90 minutes. A tube furnace can be used having an atmosphere containing a mixture of $H_2/N_2$ or pure Ar.

A catalyst according to the invention possesses improved electrochemical activity compared with earlier catalysts made from alloys of platinum including a transition metal. A catalyst according to the present invention also has better resistance to corrosion, especially resistance to poisoning in presence of phosphate anion (i.e., from phosphoric acid electrolyte). The alloy of platinum and a transition metal takes the form of crystallites, which are bonded together into particles having a diameter in the low nm range. The crystallites preferably have an average size of less than 5 nm. The size of the crystallites can be determined for example by X-ray powder diffraction. The catalyst can be produced in a batch or continuous process. A continuous process can be carried out in a continuously operated furnace such as a rotary kiln or belt calciner.

The catalyst can be used in the form of a metallic powder or attached to a support, which can optionally be a porous support. When attached to a support, the catalyst particles are generally attached to the surface of the support. The catalyst is usually not present as a complete or contiguous layer on the surface but would occupy a fraction of the surface, such as 10%, 20%, 40% or more. Suitable support materials include carbon black, ceramic materials, and metal oxides such as aluminum oxide, titanium dioxide, zirconium dioxide, silicon dioxide, tungsten oxide, and molybdenum oxide. Carbides and nitrides of transition metals are also suitable as substrates. In fuel cell applications, the support should be electrically conductive, and carbon black (e.g., Vulcan XC72 or Ketjen black EC300), graphite, or carbon nanotubes are preferred. The support can be in the form of particles, so as to increase the surface area of the catalyst. Support particles can have an average particle size in the range, for example, of 50 nm to 100 µm, and preferably are in the range of from about 50 nm to about 100 nm, or about 100 nm to about 1000 nm, The catalyst is useful as a coating for electrodes, where it can, for example, accelerate an oxygen reduction reaction (ORR). An electrode coating can be prepared by any known method. Typically, a catalyst ink is prepared by suspending a dry powder of the catalyst in a solvent, e.g., a polar solvent that is readily evaporated, such as an alcohol (e.g., isopropanol). The ink is distributed over the surface to be coated and dried to form a catalyst-coated surface. Optionally, the coated surface can be stabilized by adding a binder. A polymer that does not interfere with the electrochemistry at the electrode surface can be used as the binder. For example, Nafion® (DuPont), a copolymer of tetrafluoroethylene with perfluoro-3,6-dioxa-4-methyl-7-octenesulfonic acid, can be used as the binder. A thin film of Nafion® can be applied over the catalyst by diluting a Nafion® stock suspension with water, depositing the diluted suspension over the adhered catalyst, and drying. Nafion® films or membranes are permeable to water and highly conductive to hydrogen ions, rendering them useful in fuel cells.

The catalyst has application in different types of fuel cells, particularly in proton exchange membrane (PEM) fuel cells and phosphoric acid fuel cells.

EXAMPLES

Example 1

Synthesis of Catalysts by a Two Microemulsion Method

Preparation of Pt—Co nanoparticles utilized a two-microemulsion technique as described previously.[34] In this Example, two different methods were used, a simultaneous method and a sequential method. Reverse micellar solutions were prepared using cyclcohexane as the oil phase and sodium dioctyl sulfosuccinate (AOT) as the surfactant in the simultaneous method. The required amounts of 0.25M $H_2PtCl_6$ and 0.25M $CoCl_2$ were mixed and injected to a cyclohexane solution containing AOT. The mixtures were then sonicated to form clear and stable micellar solutions. The same procedure was used to prepare the reverse micelle solutions containing 1M aqueous $NaBH_4$ solution as the reducing agent. Then, the two reverse micelle solutions were mixed and vigorously stirred at room temperature for at least 4 hours to ensure the complete reduction of $H_2PtCl_6$ as well as $CoCl_2$. The color of the solution changed to dark black from orange due to the formation of suspended metal nanoparticles.

For the sequential reaction procedure, all solutions were made under the same conditions mentioned above. Solution (I) contained AOT, cyclohexane, and $CoCl_2$. The color of the solution was pink, reflecting the color of $Co^{2+}$ ion. Solution (II) contained AOT, cyclohexane and $NaBH_4$. Solution (III) contained AOT, cyclohexane, and $H_2PtCl_6$. Solution (I) and half of Solution (II) first were mixed under constant stirring; thereafter, the color of the solution changed to gray due to the suspended Co nanoparticles. Then, Solution (III) and the rest of Solution (II) were added to the above mixture, and stirring was continued for another 2 hours.

An appropriate amount of Ketjen carbon was dispersed into cyclohexane and sonicated for over 1 hour and then added to the Pt—Co nanoparticle suspension prepared as described above. The slurry was vigorously stirred at room temperature for another 4 hours. To break down the reverse micelles, acetone was dropped slowly into the suspension, so as to inhibit the agglomeration of platinum nanoparticles. The slurry was then filtered, washed with cyclohexane, acetone, ethanol, and water. The catalysts were dried in vacuum at 100° C. for 24 hours. The carbon-supported PtCo/C prepared by the simultaneous procedure and the sequential procedure are hereafter designated as PtCo/C—S and PtCo/C-T, respectively. Temperature programmed heat treatment at 500° C. was carried out to all PtCo/C catalysts. The heat treated catalysts are denoted as Pt—Co/C—SH and Pt—Co/C-TH, respectively.

In order to investigate the effect of pH on the redox reactions in reverse micelles and crystal growth, the same procedures were performed in basic solution with the addition of a stoichiometric amount of $Na_2CO_3$ to neuturalize the HCl produced. These catalysts are named Pt—Co/C—SB and Pt—Co/C-TB respectively.

The PtCo/C—S, PtCo/C-T, Pt—Co/C—SH, Pt—Co/C-TH, Pt—Co/C—SB and Pt—Co/C-TB catalysts were analyzed as described in Examples 2-7. In some experiments comparison is made with a commercially available conventional catalyst (Pt/C) from E-TEK, a division of De Nora North America, Inc.

Example 2

Characterization of Catalysts

A Hewlett-Packard HP 8453 UV-Vis spectrometer was used to record absorption spectra. The optical path length was 1.0 cm and 0.2M surfactant solutions were used as references.

Powder X-ray diffraction (XRD) patterns of the catalysts were taken on a Rigaku X-ray Diffractometer equipment with $CuK\alpha$ radiation. The particle size of the dispersed metal crystallites is estimated from the broadening of diffraction peaks using the Scherrer formula.[35]

A high-resolution field emission Hitachi 54800 scanning electron microscope (SEM) was used to examine the distribution of Pt alloy particles on Ketjen carbon.

The morphology and particle size distribution of Pt were examined by a JEOL JEM-1000 general purpose transmission electron microscope (TEM). A small amount of particles was dispersed in isopropanol and then applied on copper mesh with carbon film.

Example 3

Electrochemical Measurements

Electrochemical measurements were conducted in a standard three-compartment electrochemical cell at room temperature using a rotating disk electrode (RDE) setup from Pine Instruments connected to an Autolab (Ecochemie Inc. Model-PGSTAT 30). A glassy carbon disk with geometric area of $0.19625\ cm^2$ was used as the substrate for deposition of catalyst films. All potentials were measured with respect to a sealed hydrogen reference electrode (RHE) made from the same electrolyte used in the ORR experiments. Before deposition of catalyst films, the RDE was first polished with 0.05 micron alumina slurry (Buehler, Lake Bluff, Ill.) and then cleaned with distilled water under sonication. All electrochemical experiments are carried out at room temperatures.

Catalysts were prepared as described in Example 1. The composition of catalysts was analyzed by VG Elemental Plasmaquad-2 (PQ2) ICP-MS. The results can be seen in Table 1.

The catalyst inks were prepared by dispersion of certain amounts (according to the results of ICP) of Pt/C catalyst powders into 20 ml of isopropanol and then sonicated for at least 30 minutes to obtain a uniform suspension. The catalyst film was prepared by dispersing 8 µL of the catalyst ink on a glassy carbon (GC) substrate and dried at room temperature to reach a total metal loading of 15 µg $cm^{-2}$. A diluted Nafion solution (Water:Nafion ratio of 50:1) was then applied on the catalyst film and dried in air. The Nafion film was used as binder to prevent the loss of catalysts from the glassy carbon substrate during ORR measurements. The effect of very thin Nafion film over the catalyst films is negligible in ORR measurements.[36]

Cyclic voltammograms were also taken in 1.0 mol $L^{-1}$ KOH while a gold disk (9 mm in diameter) served as the working electrode and a platinum wire and Hg/HgO (KOH 1.0 mol L−1) system were used as counter and reference electrode.

In the part of RRDE measurement the preparation of inks and electrode preparation were similar to those of RDE measurement. The RRDE (Pine Instrument Company) consisted of a GC disk (5 mm in diameter) and a gold ring sealed in a polytetrafluoroethylene holder. The collection efficiency N determined using a solution of $[Fe(CN)_6]^{4-}/[Fe(CN)_6]^{3-}$ redox couple was 0.39. All RRDE experiments were performed in $O_2$ saturated 1M $HClO_4$. The disk electrode potential was then scanned between 1.2V vs RHE and 0.2V vs RHE at 20 mV/s, the ring electrode potential being held at 1.3V vs RHE where the $H_2O_2$ oxidation reaction was under diffusion control at all rotation rate.[37] The $H_2O_2$ portion was detected for different rotation rates ($\omega$). The ring current at certain potential was proportional to $\omega^{1/2}$. Consequently, only one rotation rate is presented ($\omega$=900 rpm).

Example 4

UV-Vis Spectroscopy

UV-vis measurement is a reliable way to confirm the formation of particles of Pt in microemulsions.[38] Pt—Co alloy catalyst was made as described in Example 1. As can be seen in FIG. 1, two peaks (221 nm, 261 nm) corresponding to mixture of $PtCl_6^{2-}$ and $Co^{2+}$ in reverse micelles are identical to so called "ligand-to-metal charge-transfer" absorption bands.[39] Similar peaks (223-225 nm) were presented confirming the presence of Pt—Co nanoalloy produced by both simultaneous procedure and sequential procedure. The peak positions of Pt—Co nanoalloy significantly red shifted compared with physical mixture of a microemuslion containing Pt and a microemuslion containing Co (210 nm), which is due to the weaker plasma frequency in the ultraviolet range or interband transitions of Pt—Co nanoalloy.[32, 40]

Example 5

TEM and SEM Measurements

Representative TEM images of as-synthesized PtCo/C catalysts by the two microemulsion method are shown in FIG.

Figure 2:
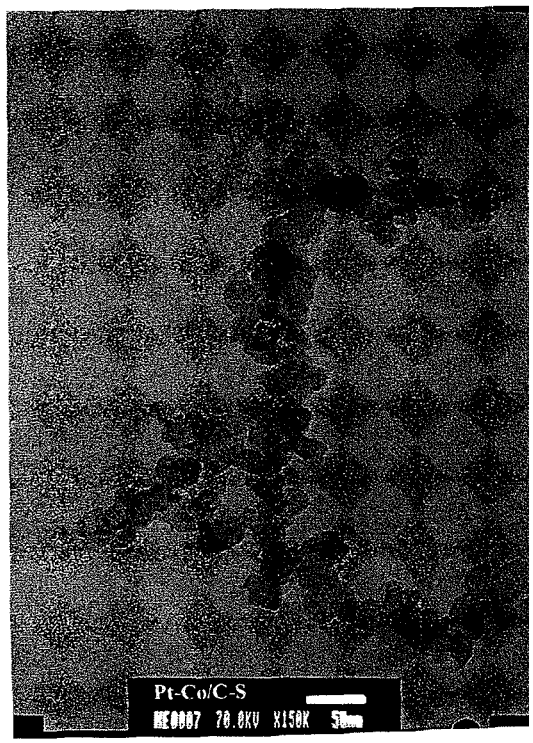
FIG. 2 (a) shows a transmission electron micrograph of PtCo/C—S and the size distribution of the platinum nanoparticles.
Figure 2:
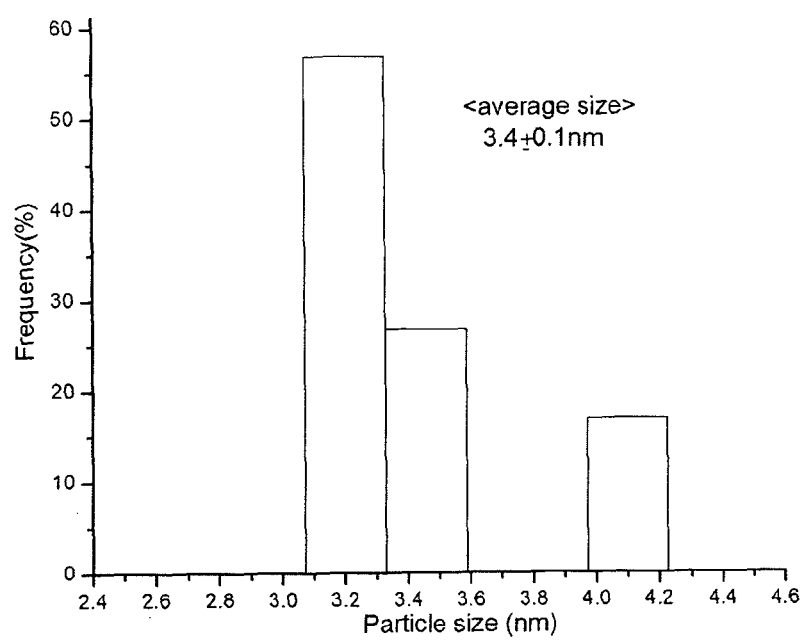
Figure 2:
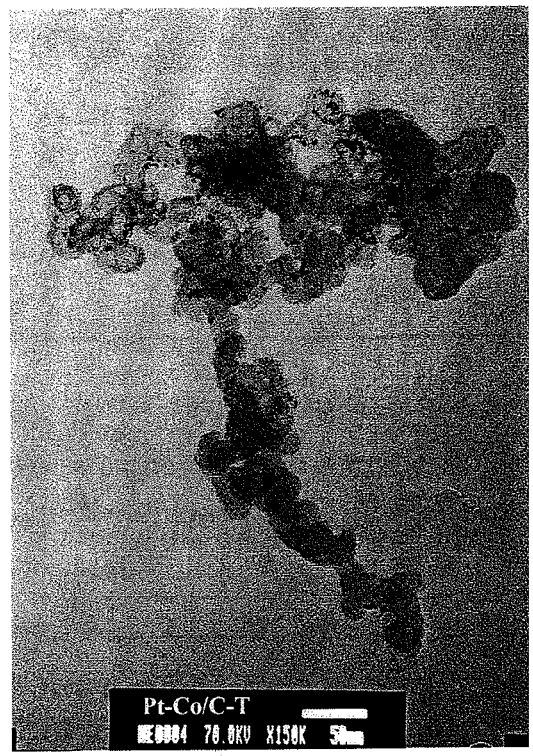
Figure 2:
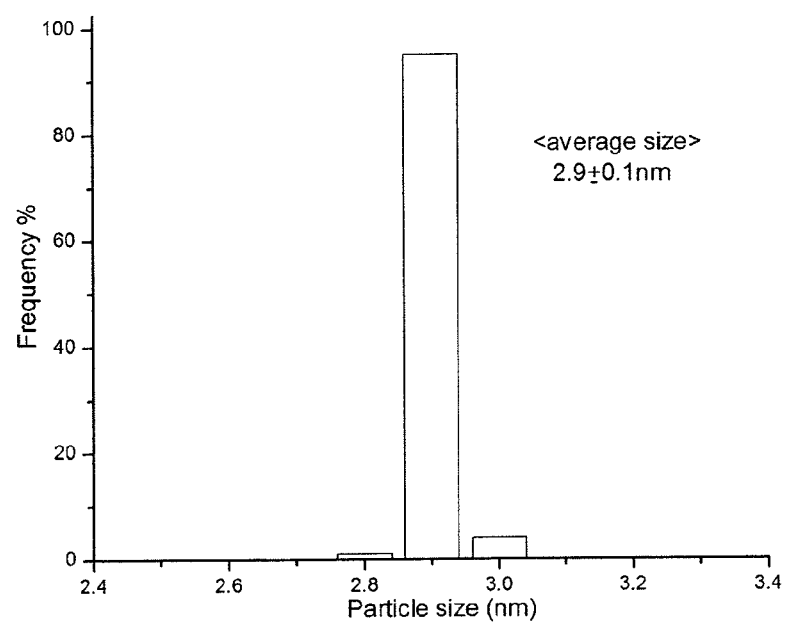

2. From the histograms in FIG. 2, narrow particle size distribution can be seen for both Pt—Co/C—S and Pt—Co/C-T, which is evidence that the microemulsion method is efficient to synthesize Pt based catalyst with controllable particle size, size distribution, and morphology of the individual grains. The average particle size of Pt—Co/C—S and Pt—Co/C-T were 3.4 nm and 2.9 nm respectively. Both were evenly distributed on the carbon, although there were some particles agglomerated on Ketjen Black EC-300J Carbon in FIG. 2 (a). Also, the differences in particle size and the microstructure of Pt—Co/C—S and Pt—Co/C-T were due to different nucleation and growth processes by simultaneous and sequential method. In the latter case, Co cores with the same particle size were formed in reverse micelles and separated first. Afterwards, Pt shells were produced surrounding the cores.

Figure 3:
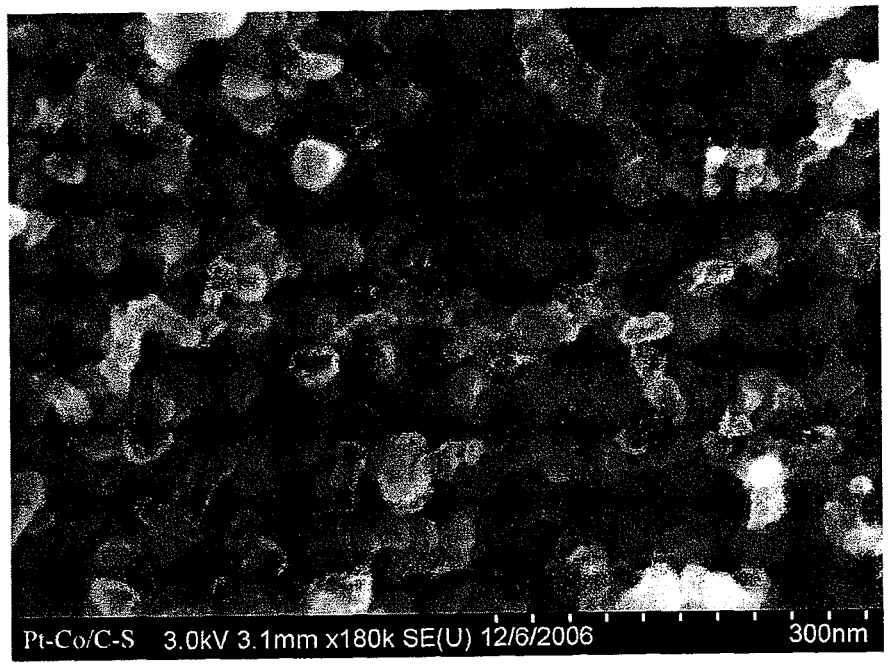
FIGS. 3 (a)-(d) show SEM micrographs of (a) PtCo/C—S, (b) PtCo/C-T, (c) PtCo/C—SH, and (d) PtCo/C-TH.
Figure 3:
Figure 3:
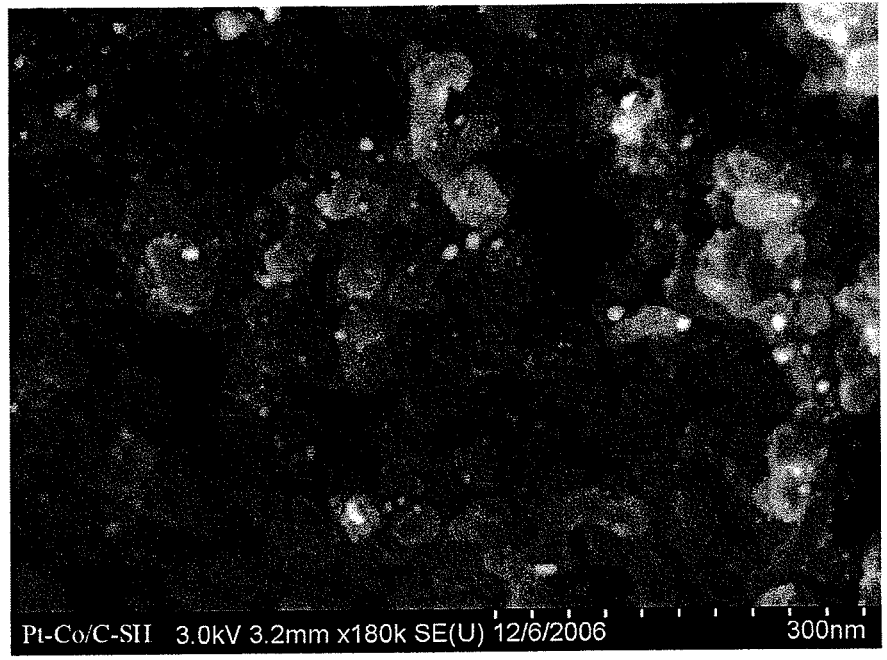
Figure 3:
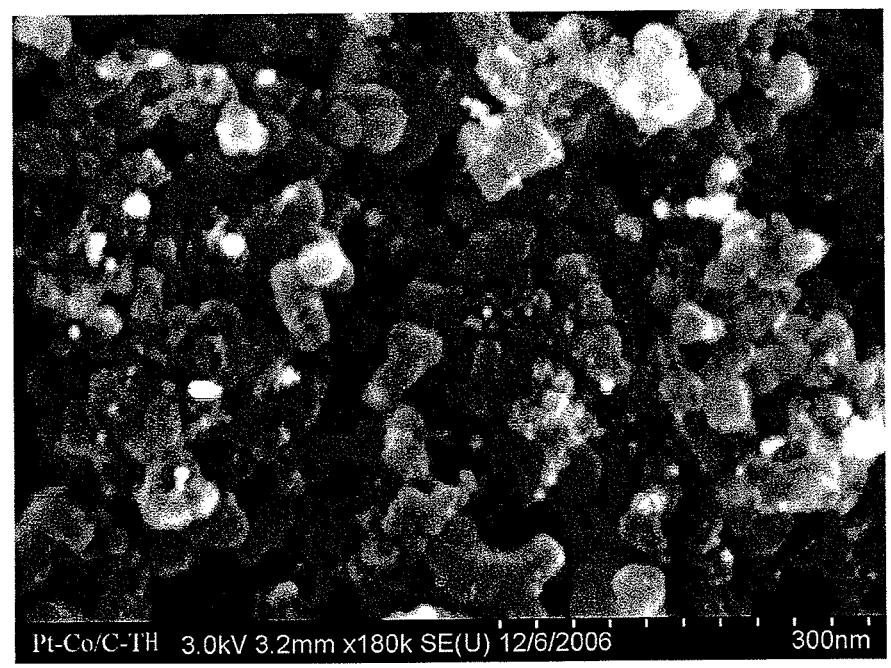

SEM images of Pt—Co/C—S and Pt—Co/C-T as well as catalysts after heat treatment are shown in FIG. 3. A number of white dots representing Pt—Co particles were distributed on carbon support homogeneously for the catalysts synthesized at room temperature. No severe agglomeration could be found even for Pt—Co/C—SH and Pt—Co/C-TH. However, much larger particle sizes could be seen due to temperature sintering effects.

Example 6

XRD Characterization

Figure 4:
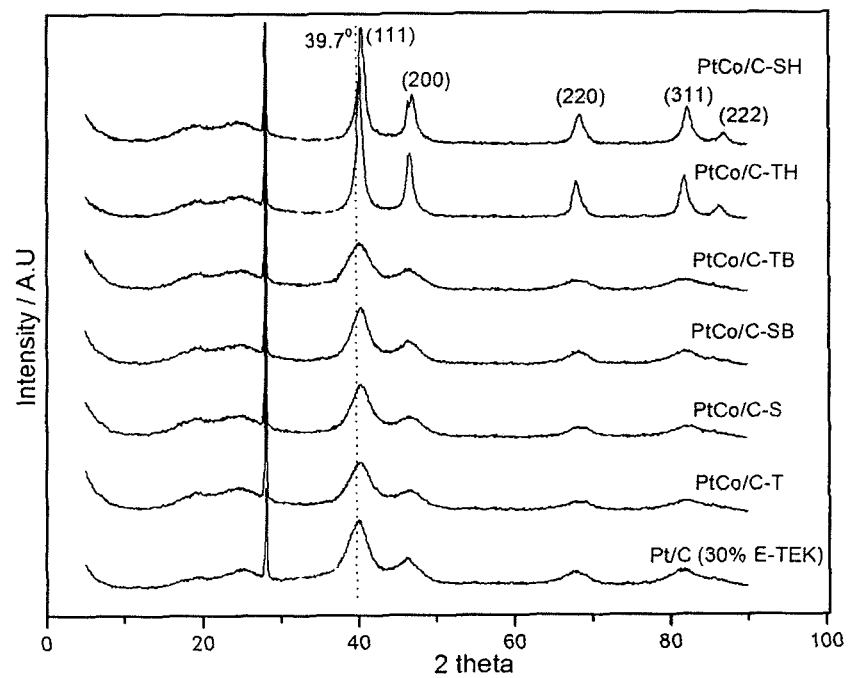
FIG. 4 shows X-ray diffraction patterns of Pt/C (30% E-TEK), PtCo/C—S, PtCo/C-T, PtCo/C—SB, PtCo/C-TB, PtCo/C—SH and PtCo/C-TH.

FIG. 4 shows the representative XRD patterns of the various catalysts synthesized.

Both the positions and intensity were normalized by the peak at 28.037° caused by $SiO_2$ of glass holders. A broad peak at $2\theta \approx 25°$ corresponds to diffraction of the carbon support.[41] The substitution of smaller Co atoms into the Pt lattice may cause a right shift of peaks (see Table 2) of PtM/C as compared to Pt/C.[42] Less right shift could be seen for PtCo/C-T and PtCo/C-TB in Table 2, indicating that some Co cores remained so that Co is enriched in the underlayer of PtCo/C-T. This means that, in the sequential procedure, not all Co cores formed first by reducing $Co^{2+}$ with $NaBH_4$ were dissolved and contracted Pt lattice thereby after adding reverse micelles containing $PtCl_6^{2-}$ although $PtCl_6^{2-}$ is a good oxidizing agent to Co. In addition, no well defined diffraction peaks suggesting the presence of any metallic Co or oxide phases can be seen. This is probably because the Co loading was very low and any metal Co species present were highly dispersed or amorphous.[33]

Together with the data from the peak positions and intensities of Pt—Co alloy from ASTM cards, the diffraction patterns of all as-synthesized catalysts including those after heat treatment are in accord with face centered cubic structure. The formation of disordered structures is indicated by the absence of superlattice reflections in the patterns of all PtCo/C catalysts made by the microemulsion method. In addition, as to samples after heat treatment, higher intensity and sharper peaks were obtained which means more interpenetration of Co and achievement of higher ordered structure. Furthermore, solid solution may occur by heat treatment with the symbol of splitting of diffraction peaks.[36] According to Bragg's law, the d-spacing formula[44] can be simplified for cubic (111):

$$\frac{1}{d_{111}^2} = \frac{3}{a^2} \quad (1)$$

$$\left(\frac{2\sin\theta}{\lambda}\right)^2 = \frac{3}{a^2} \quad (2)$$

Here, $d_{111}$ is perpendicular distance between planes; a is the lattice constant.

Furthermore the Pt—Pt distance, $d_1$, can be calculated from equation (3), $$\left(\frac{2\sin\theta}{\lambda}\right)^2 = \frac{3}{2d_1^2} \quad (3)$$

The main diffraction peaks and lattice parameters for as-synthesized PtCo/C catalysts were summarized in Table 2. Regardless of difference of reaction conditions, less extent of alloying could be seen for PtCo/C-T and PtCo/C-TB catalysts by sequential method since lattice parameter and Pt—Pt bond distance show less shrinking compared to PtCo/C—S and PtCo/C—SB.[42] In other words, some isolated Co phases may exist in such Pt-enriched system. However, whether they are on the surface or surrounded by Pt shell needs to be determined by other techniques (e.g. cyclic voltammograms in alkaline media, see section 3.4).

The average crystallite size for PtCo/C catalysts and commercial catalyst was calculated using the Debye-Scherrer equation[35]:

$$Z = C\lambda/B \cos\theta \quad (4)$$

Where Z is the diameter of the average particle size in Å; λ is the X-ray wavelength (1.5406 Å) for $CuK_\alpha$; θ is the Bragg angle; C is a factor (typically from 0.9 to 1.0) depending on crystallite shape; B is the full width at half maximum. Smaller particles could be formed by the sequential method than by the simultaneous method due to different nucleation and growth processes. The trends in particles size between XRD results and TEM measurements correlate well.

Example 7

Electrochemical Characterization

Figure 5:
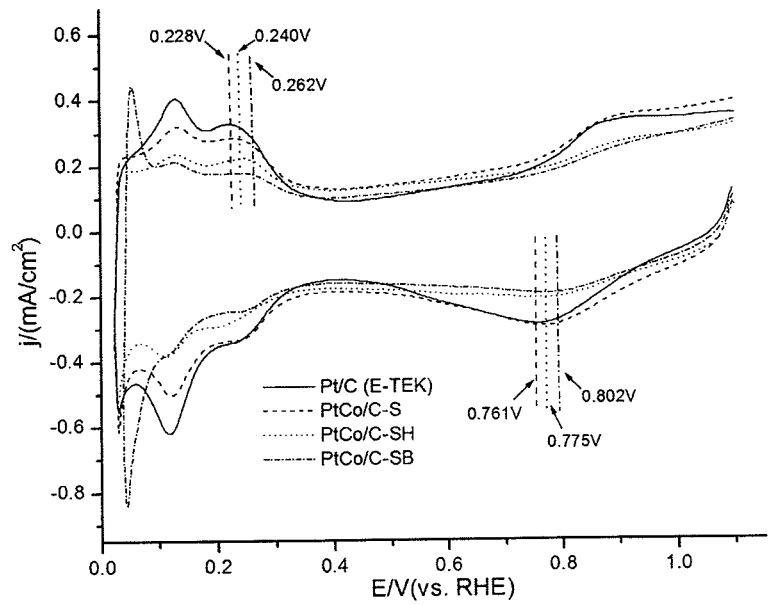
FIG. 5 (a) shows cyclic voltammetry of Pt/C (E-TEK), PtCo/C—S, PtCo/C—SH and PtCo/C—SB at room temperature in Ar— saturated 1M $HClO_4$ at 50 mV/s vs. RHE FIG. 5 (b) shows cyclic voltammetry of Pt/C (E-TEK), PtCo/C-T, PtCo/C-TH and PtCo/C-TB at room temperature in Ar-saturated 1M $HClO_4$ at 50 mV/s vs. RHE.
Figure 5:
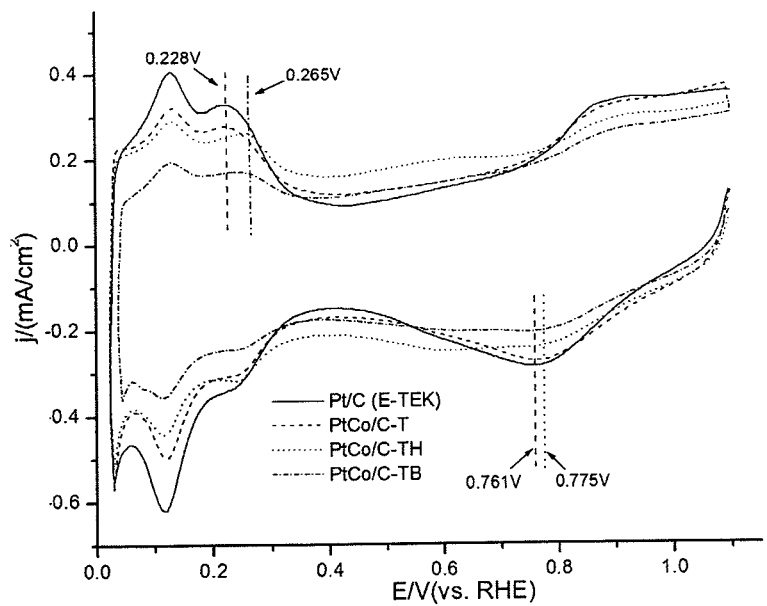

Steady-state cyclic voltammograms of all catalysts in FIG. 5 were cycled in 1M $HClO_4$ between 0.035 and 1.1V/RHE in order to avoid possible changes in Pt Electrochemical area (ECA) and surface composition.[4] The double layer of Pt/C (E-TEK) is the thinnest because Vulcan XC-72 carbon was used as support. However, Ketjen carbon may be more suitable to support metal in synthesis by the microemuslion method. The high surface area and porous structure may be beneficial to increase product yield from the point of view of technology although thicker double layer could be formed during the electrochemical test. Furthermore, redox couple peaks can be seen at 0.6V on the cyclic voltammogram of PtCo/C-TH. This could be due to the migration of reduced Co to the surface after heat treatment to PtCo/C-T in $H_2$/Ar mixture.

Additionally, it was observed that the $H_{upd}$ region and peak potential of oxide reduction shift to positive potentials to different extent for all catalysts prepared by the microemulsion method in comparison with commercial Pt/C (E-TEK). It is believed that these shifts are due to higher 5d-band vacancies by alloying Pt with the second transition metal or lower activity of water.[16] Also, this will be beneficial to oxygen reduction because of more inhibition of adsorption of anions, in particular $OH^-$.[45]

ECA of Pt was calculated from both integration of the hydrogen adsorption and desorption peaks. Assuming a correlation value of 210 $\mu C/cm^2$ [46] average results were tabulated in Table 3. The much smaller ECA of PtCo/C—SH and PtCo/

C-TH is in line with larger particle size after heat treatment. However, it is surprising to find that PtCo/C—SB and PtCo/C-TB have smaller ECA than PtCo/C—S and PtCo/C-T even though the former are quite similar to the latter in particle size. Considering the process of synthesis, $PtCO_3$, $Pt(CO_3)_2$ or other solid salts of platinum might precipitate out after adding $Na_2CO_3$ used to adjust the pH of the reverse micelles solutions. These precipitates of platinum may prevent H from adsorption on Pt atoms surface.

Figure 6:
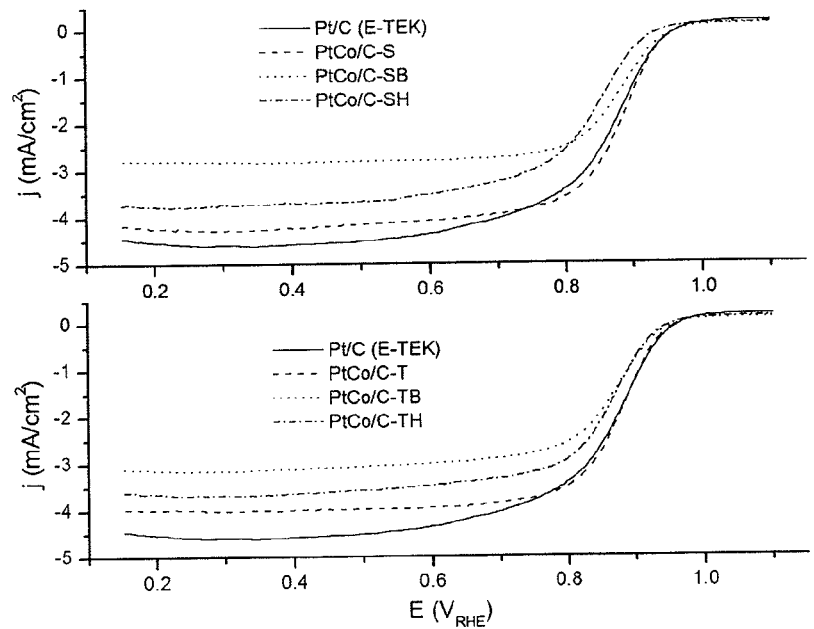
FIG. 6 (a) shows disk current density (based on geometric area of the electrode) obtained during the oxygen reduction reaction (ORR) on Pt/C (E-TEK), PtCo/C—S, PtCo/C—SH, PtCo/C—SB, PtCo/C-T, PtCo/C-TH and PtCo/C-TB in $O_2$-saturated 1M $HClO_4$ at room temperature. Scan rate: 20 mV/s, with 15 μg/cm² of Pt loading on the electrode.
Figure 6:
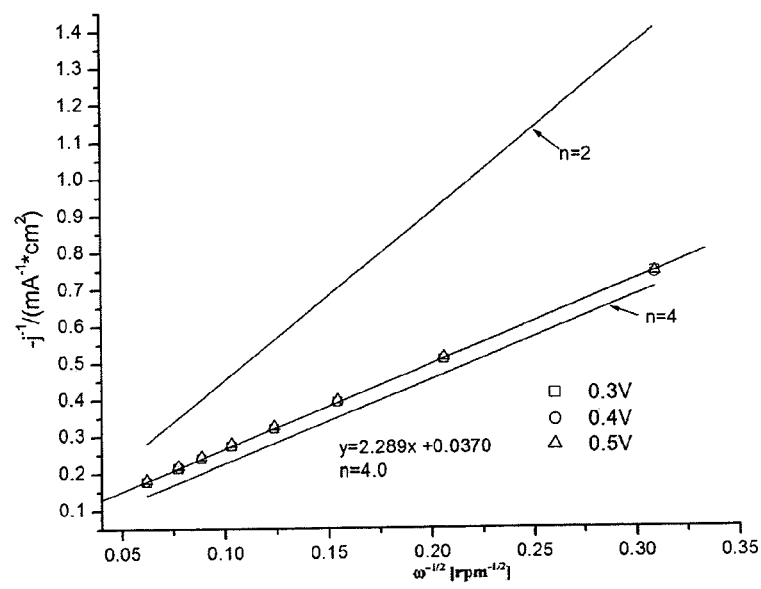

FIG. 6 shows disk polarization curves for the ORR on as-prepared catalysts at 1600 rpm, along with the kinetic analysis, presented in the form of the Kotecky-Levich plots. A cyclic voltammogram recorded in Ar purged solution was subtracted from ORR polarization current density at the same sweep rate to eliminate the influence of the irreversible adsorption of oxides and charge of the electrical double layer on platinum.[47] In FIG. 6 (a), three regions can be perceived, namely, a diffusion-controlled region (<0.65V), a mixed diffusion-kinetic limitation region (0.65V to 0.85V), and a Tafel region (>0.85V). Similar results were obtained for all PtCo/C catalysts made by the microemulsion method as well as commercial Pt/C catalyst. The ORR current I is expressed by Koutecky-Levich equation[36]:

$$\frac{1}{j} = \frac{1}{j_k} + \frac{1}{j_d} + \frac{1}{j_f} \quad (5)$$

$$j_d = 0.620 nFD^{2/3} C_0 v^{-1/6} \omega^{1/2} \quad (6)$$

In this equation, $j_k$ is the kinetic current density, $j_d$ is diffusion limiting current density, $j_f$ is the diffusion-limited current density through the Nafion film; n is the number of exchanged electron; ω is the angular frequency of rotation, $\omega=2\pi f/60$, f is RDE rotation rate in rpm; F is the Faraday constant (96485 C $mol^{-1}$), D is the diffusion coefficient of the molecular $O_2$ in 1 M $HClO_4$ solution ($1.9\times10^{-5}$ $cm^2$ $s^{-1}$), ν is the kinematic viscosity ($9.87\times10^{-3}$ $cm^2$ $s^{-1}$), $C_O$ is the concentration of molecular oxygen ($1.6\times10^{-6}$ mol $cm^3$).

The thickness of the Nafion film used to bind catalysts on the electrode is sufficiently small that its resistance is negligible.[48] As a result, the equation (5) can be adjusted to simpler equation (7) without further need of the additional term:

$$\frac{1}{j} = \frac{1}{j_k} + \frac{1}{j_d} \quad (7)$$

Consequently, at certain potentials, $j^{-1}$ was plotted versus $\omega^{-1/2}$ and straight lines could be obtained. The theoretical lines for a 2 electron ORR process and a 4 electron ORR process were also drawn in FIG. 6 (b). The number of exchanged electrons was calculated from the slope of straight lines. The n values of various catalysts in Table 4 were illustrative of the 4 charge-transfer pathway of ORR on most of them. Also, it may confirm that there is little isolated Co in as-synthesized catalysts since the transition metals are believed to cause part of the $H_2O_2$, intermediate of oxygen reduction, which is not reduced to $H_2O$ and thereby produces a low n value.[15,46]

Figure 7:
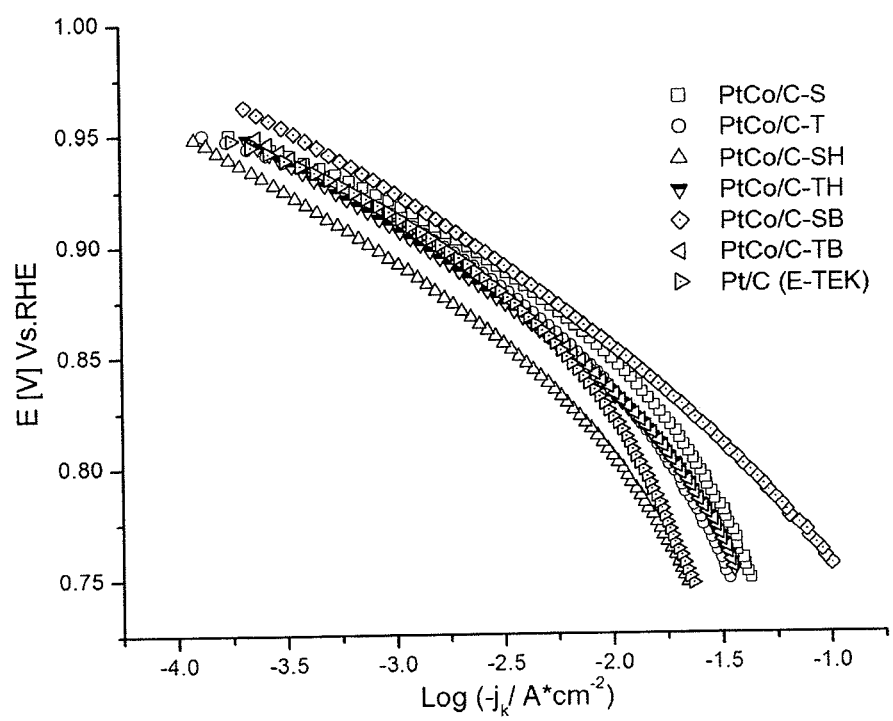
FIG. 7 shows mass corrected Tafel plots of $j_k$ for ORR obtained from disk current in the anodic sweep at 1600 rpm on PtCo/C catalysts made by the microemulsion method and Pt/C (E-TEK) catalysts. Scan rate: 20 mV s$^{-1}$.

Mass transport corrected Tafel plots (E vs. log [$j_k$]) are shown in FIG. 7 for Pt/C (E-TEK) and PtCo/C by the microemulsion method. In spite of the general transition in the Tafel slope, two Tafel regions were roughly defined around RT/F (~60 mV/decade) for the low overpotential range (E>0.85V) and 2RT/F (~120 mV/decade) for the high overpotential range (E<0.80V). The slopes of Tafel curve are usually used to be indicative of pathways in which ORR undergoes.[49] In their series of kinetics studies of ORR on Pt and Pt based alloy catalysts, Markovic and his coworkers[8,50] suggested that in $HClO_4$ where there is no specific adsorption, the Tafel slopes are controlled by both "energetic effects" (Temkin to Langmuir adsorption)[12,51] and "blocking effects" (surface coverage of OH controlling availability of $O_2$ adsorption)[52] With concerns of Tafel plots in FIG. 7 and slope values in Table. 3 PtCo/C-T, PtCo/C-TB as well as PtCo/C-TH made by the sequential method show quite similar oxygen reduction processes. The physical attributes of Pt in the catalyst, including Pt—Pt bond distance and coordination number, but not including particle size (see Table 2), is not significantly altered by changing the pH of the microemulsion solution or even by heat treatment, probably due to a relatively "conservative" synthesis in the sequential method. In contrast to the above similarity, larger differences of Tafel slopes could be seen for PtCo/C—S, PtCo/C—SH and PtCo/C—SB. In this case, cobalt was reduced competitively with Pt by $NaBH_4$ which may lead to such complexity of the kinetics of ORR after changing reaction conditions during the synthesis.

Figure 8:
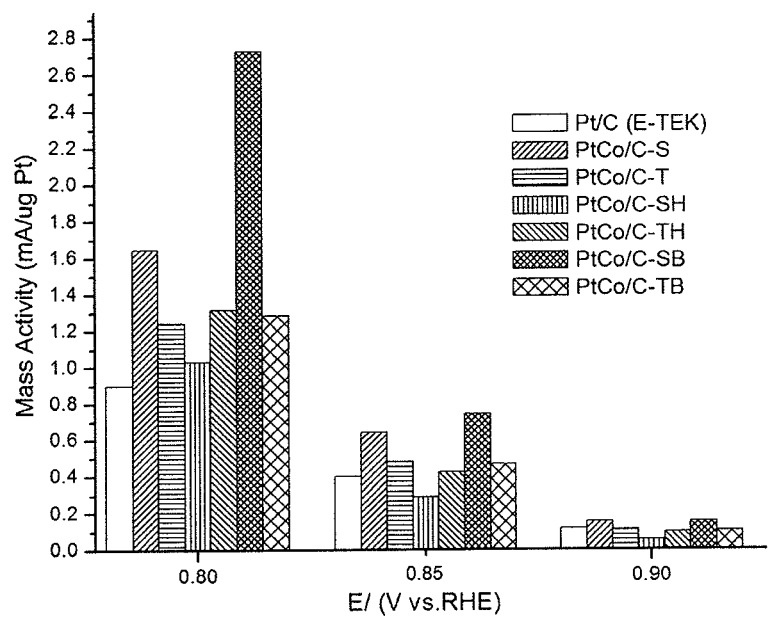
FIG. 8 (a) shows mass activity of PtCo/C catalysts made by the microemulsion method and Pt/C (E-TEK) towards ORR at different potentials.
Figure 8:
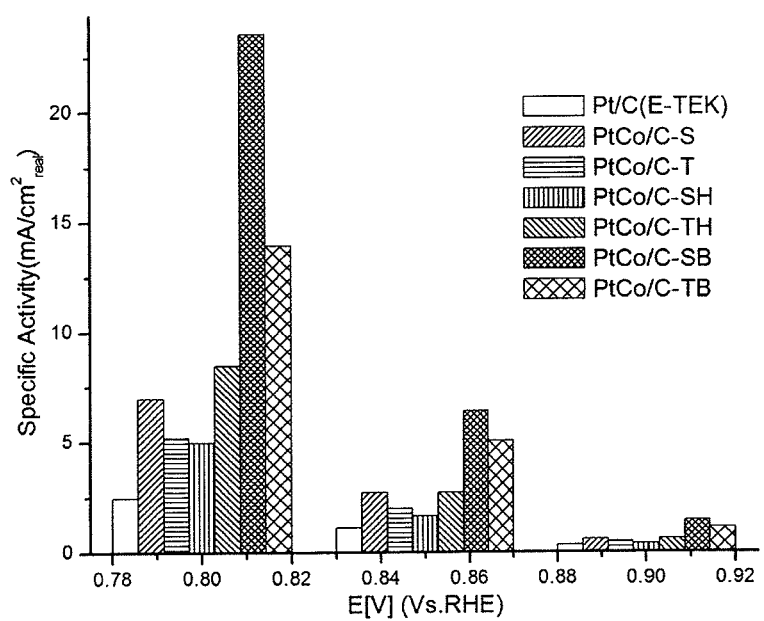

Mass activity and specific activity of as-synthesized catalysts and commercial catalyst towards ORR are summarized in Table 3 and also can be seen in FIG. 8. Some trends can be found: PtCo/C—SB>PtCo/C—S>PtCo/C-T~PtCo/C-TB~PtCo/C-TH>Pt/C (E-TEK)>PtCo/C—SH (Mass Activity); PtCo/C—SB>PtCo/C-TB>PtCo/C-TH~PtCo/C—S>PtCo/C-T~PtCo/C—SH>Pt/C (E-TEK) (Specific Activity). To different extents, catalytic performance of PtCo/C catalysts produced by the microemulsion method exceed that of commercially available Pt/C catalysts. Again, reaction conditions in the synthetic process need to be considered. Alkaline media seem to be more suitable for Pt and Co to coexist well albeit with some insoluble salt formation. In addition, heat treatment is commonly used to achieve good alloy of Pt and other transition metals.[9-11,53] However, heat treatment is not useful for PtCo/C—S by simultaneous reaction procedure to enhance its catalytic activity towards ORR, which suggests that Pt and Co have contacted closely after reduction at room temperature. Notwithstanding, it is important to do the heat treatment for PtCo/C-T by sequential reaction procedure because more than one phase might be formed after Pt is coated on a Co surface.

Redox-type processes involving the first row transition elements alloyed with Pt may be a reason for the enhanced ORR activity on PtM (M=transition metal) alloys catalysts as mentioned in Stamenkovic et al's study of surface composition effects of PtM(M=Ni, Co) alloy on ORR.[8] They pointed out that transition metals may serve as "sacrificial" elements to be oxidized and inhibit the adsorption of $OH_{ad}$ on Pt sites. Our results confirmed their plausible explanation as following. The reaction order (m) of ORR on as synthesized catalysts was first checked from the plots of log(i) versus log(i–$i/i_d$).[50] From Table. 3, the first order dependence of the kinetics of the ORR was performed on PtCo/C made by the two microemulsion method and commercial Pt/C. Therefore, the general rate expression can be seen in equation 8, assuming the first electron transfer for oxygen reduction ($O_{2(ad)}+e^-\rightarrow O^-_{2(ad)}$) is the rate determining step:

$$i=nFKC_{O2}(1-m\theta_{ad})^x\exp(-\beta FE/RT)\exp(-\gamma r\theta_{ad}/RT) \quad (8)$$

where F is the Farady's constant, K is the rate constant, $C_{O2}$ is the concentration of $O_2$, m is the reaction order, $\theta_{ad}$ is the surface coverage of adsorbed intermediates, β and γ are symmetry factors, E is the applied potential, $r\theta_{ad}$ is a parameter related to the rate of change of the apparent standard free energy of adsorption with the surface coverage of an oxide layer.[8,16,54] Since other parameters are identical to catalysts with different surface composition, the item of $(1-\theta_{ad})$ (m=1) may control predominately the entire kinetics of ORR. The more available sites are for $O_{ad}$, the lower is the $\theta_{ad}$ value. Consequently, in $HClO_4$, the better inhibition of adsorption of OH on PtCo/C leads to higher possibility for $O_2$ to access to active sites on Pt surface and higher mass activity and specific activity eventually. From Table. 3 the positive shift of both half-wave potential and peak potential of oxide reduction may be two criteria to confirm the redox-type process effect of cobalt as "sacrificial" elements oxidized.[8]

Figure 9:
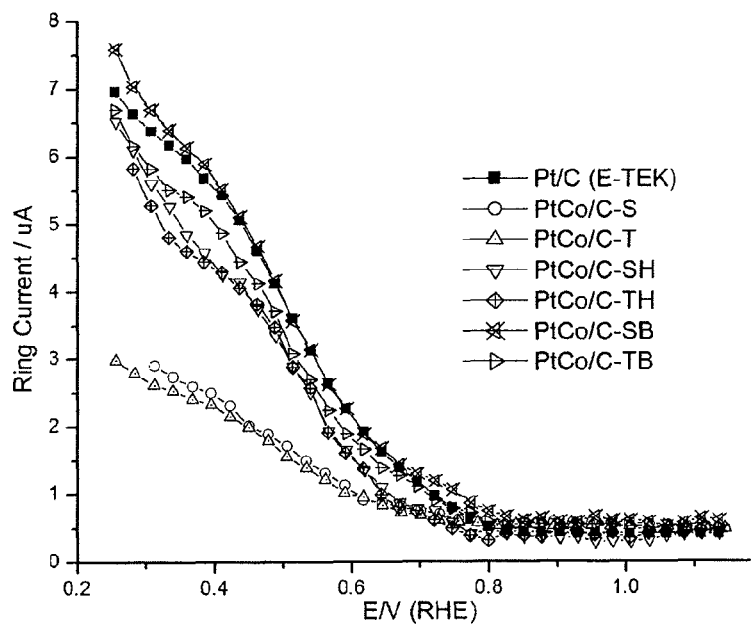
FIG. 9 shows ring electrode current ($I_R$) (anodic sweep direction) during the ORR at 900 rpm on all PtCo/C catalysts made by the microemulsion method and commercial Pt/C in 1.0M $HClO_4$ at a sweep rate of 20 mV/s.
Figure 10:
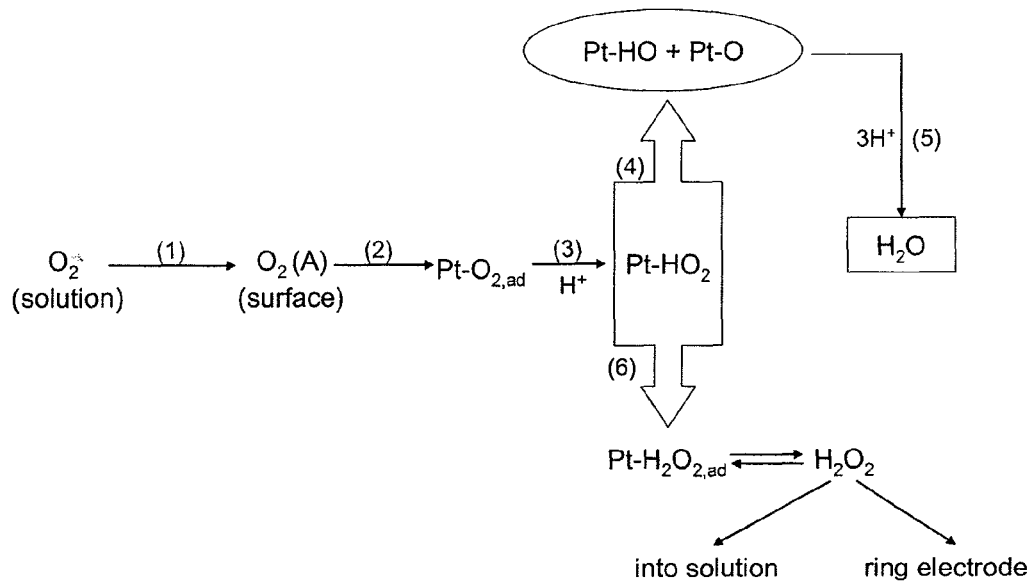
FIG. 10 shows a simplified sketch map of the oxygen reduction reaction pathway.

A representative set of ring currents obtained on a gold ring electrode during ORR on PtCo/C catalysts made by the two microemulsion method and a Pt/C (E-TEK) sample at 900 rpm are shown in FIG. 9. The relative amounts of $H_2O_2$ formed on the catalysts at typical operating potential in a fuel cell (0.6V and 0.7V) were shown in Table 3 based on the formula:

$$\chi_{H_2O_2} = \frac{2I_R/N}{I_D + I_R/N} \quad (9)$$

$$N = 0.39$$

where N is the collection efficiency of the ring, $\chi$ is the mole fraction of peroxide formed, and $I_D$ and $I_R$ are the disk and ring currents. From FIG. 9, the ring currents account for a negligible percentage of the disk current above 0.6V for all catalysts. It is not reasonable to sum up peroxide yield of ORR in only certain issues such as Pt particle size and Pt—Pt bond distance since they may take effects mutually and a lot of variables remain undetermined to get an insight into the reaction pathway for oxygen reduction. Antoine et al[55] assumed that bridged end-on $O_2$ adsorption prefers to happen on low coordination surface atoms (tops and edges) and leads to larger proportion of $H_2O_2$ production for catalysts with smaller particle size. In our previous study[38], smaller peroxide yield was found for ORR on Pt/C (water/AOT ratio=8) with smaller Pt particle size compared to Pt/C (water/AOT ratio=5, 11) with larger Pt particle size. Stamenkovic et al[8] did not find any difference of production of $H_2O_2$ on the $Pt_3Ni$, $Pt_3Co$ and "Pt-skin" in comparison with pure Pt. Various amounts of peroxide were also detected on different low index single crystal surface.[56, 57] In addition, 4-fold enhancement of peroxide yield in 6M TFMSA as compared to 1M TFMSA was found in Murthi et al's study,[16] in which the high concentration (6M) TFMSA provided the conditions of lower activity of water due to lower ratio of water and acid. As a result, comparisons were only made between samples made by the simultaneous procedure and their counterparts made by the sequential procedure, i.e. PtCo/C—S vs. PtCo/C-T; PtCo/C—SH vs. PtCo/C-TH; PtCo/C—SB vs. PtCo/C-TB. The results are tabulated in Table 4 and can be explained from the perspective of water activation and the formation of adsorbed oxygenated species (primarily Pt—OH). A description of the reaction pathway of the oxygen reduction reaction is proposed and can be seen in FIG. 10.[13, 58, 59] Based on the conclusion by Tseung[60-63] that oxygen is mainly reduced via the series pathway with peroxide as the intermediate, catalysts with less "OH adsorption poisoning" are supposed to perform better towards ORR with more active sites available for $H_2O_2$ reversible adsorption and give more $H_2O_2$ yield which can be detected by RRDE technique. Their conclusion is in good agreement with our finding that the trend of M.A. of as synthesized catalysts (PtCo/C—S>PtCo/C-T; PtCo/C—SB>PtCo/C-TB; PtCo/C-TH>PtCo/C—SH) is consistent with the trend of peroxide yield (PtCo/C—S>PtCo/C-T; PtCo/C—SB>PtCo/C-TB; PtCo/C-TH>PtCo/C—SH).

Figure 11:
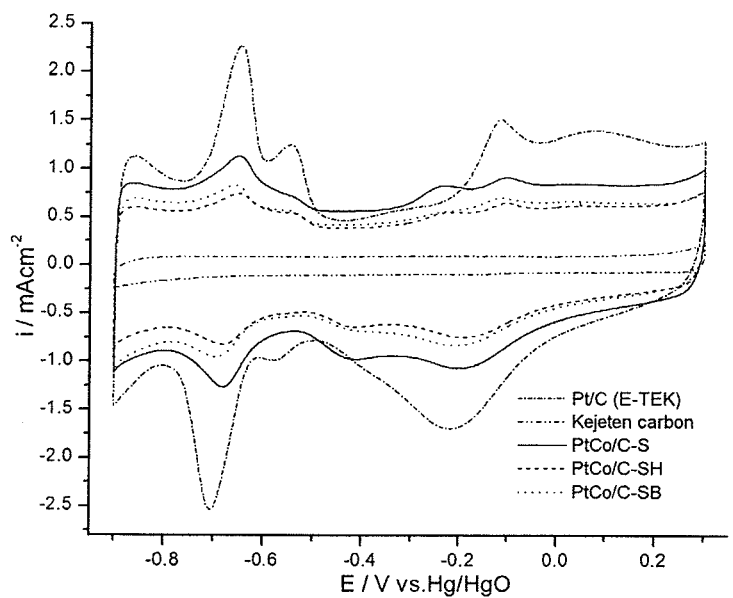
FIG. 11 (a) shows cyclic voltammograms obtained for Pt/C (E-TEK), PtCo/C—S, PtCo/C—SH, PtCo/C—SB and ketjen carbon in 1.0 mol L$^{-1}$ KOH at 50 mV s$^{-1}$.
Figure 11:
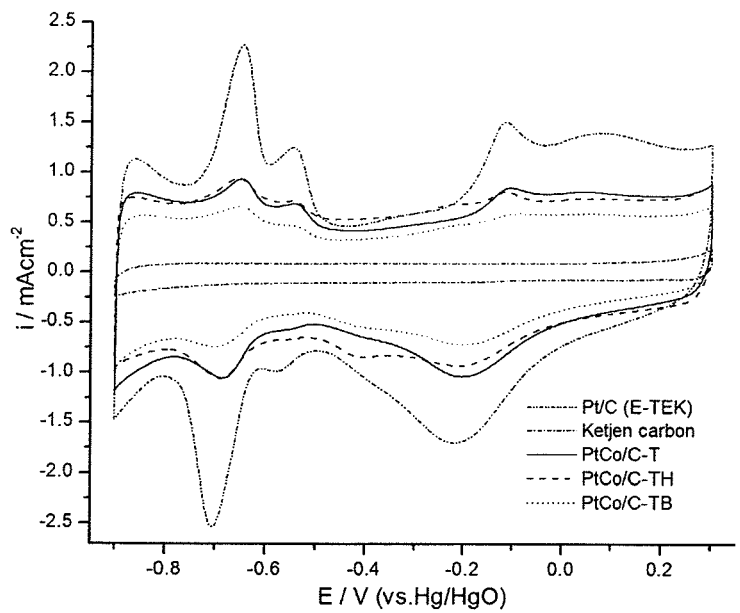
Figure 12:
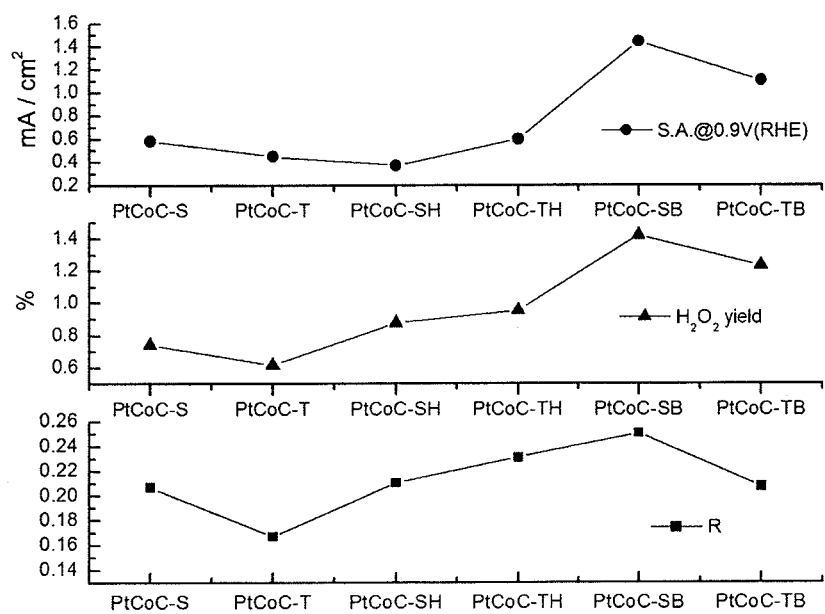
FIG. 12 shows R values (integrated charge of Co oxidized/integrated charge of $H_{upd}$), $H_2O_2$ yield at 0.6V (RHE), and specific activity (S.A.) at 0.9V (RHE) of PtCo/C made by the microemulsion method

Cyclic voltammograms obtained in a PEM fuel cell in 1M KOH as the methodology to probe surface composition for above catalysts are shown in FIG. 11. It is believed that a redox couple in the potential window of −0.2V to −0.5V vs. Hg/HgO is involved in the redox process relative to Co which is evident in the cyclic voltammogram of PtCo/C—S.[12] Integration was made in the hydrogen UPD region (−0.78V to −0.47V vs. Hg/HgO) and oxide species of Co formation region (−0.37V to −0.16V vs. Hg/HgO). Ratios of charge of these two regions may reflect atomic ratio of Co and Pt (named R thereafter) on the surface of catalysts. Although it is definitely not actual value of molar ratio of metallic Co and Pt, comparison between as-synthesized catalysts can be taken correspondingly. The results can be found in Table 4 and FIG. 12. R values of PtCo/C-T and PtCo/C-TB are lower than those of their counterparts of PtCo/C—S and PtCo/C-TB due to different synthesis procedures. Higher R value of PtCo/C-TH than that of PtCo/C—SH suggested that migration of Co from inner layer to outer layer of both catalysts did happen during heat treatment process and the better contact of Pt and Co was gained for catalysts by simultaneous procedure. It is worthwhile to correlate R value with specific activity (S.A.) and peroxide yield for as-synthesized PtCo/C catalysts. It seems that PtCo/C—S, PtCo/C-TH and PtCo/C—SB with higher R values have better catalytic characteristics with respect to ORR and higher $H_2O_2$ yield than their counterparts presumably due to a sacrificial effect of Co oxidation on inhibition of adsorption of OH as mentioned above.

Example 8

Single-Step Synthesis of Pt Catalyst from Acetylacetonate Complex

Figure 13:
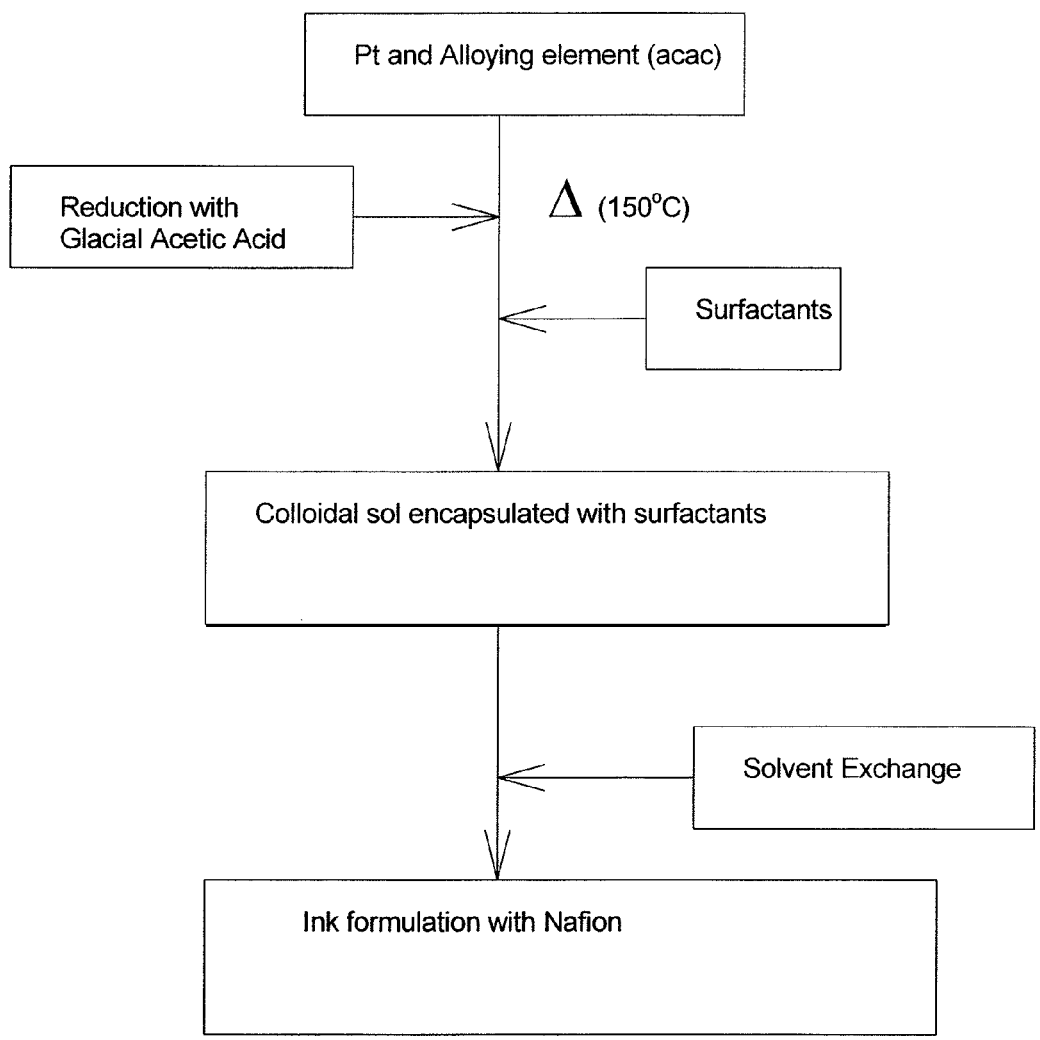
FIG. 13 shows a flow chart representing a micellar process for synthesis of a platinum alloy catalyst according to the invention.
Figure 14:
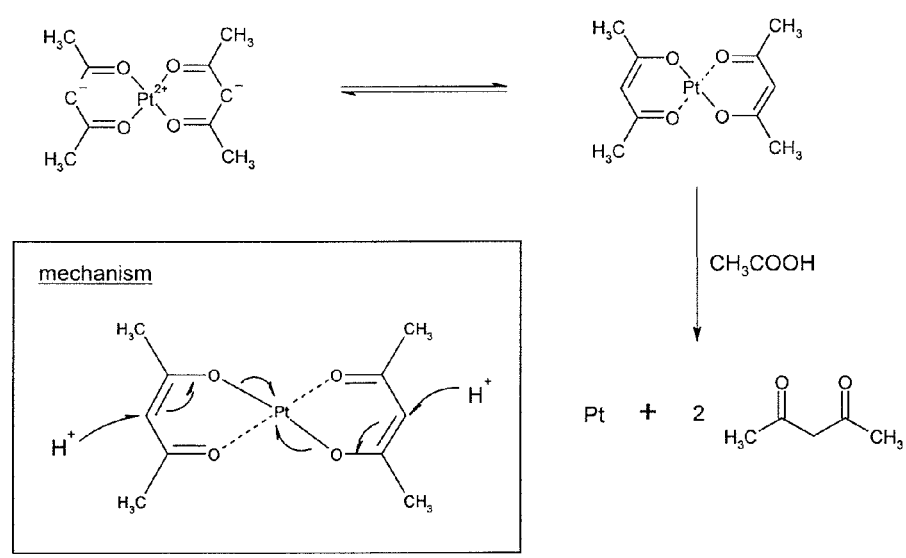
FIG. 14 shows a reaction scheme for the reduction by glacial acetic acid of platinum acetyl acetonate complex to form a platinum sol.

A single step synthesis was developed using reduction methods that enable simultaneous colloidal sol formation of Pt and the alloying elements. For this purpose, acetyl acetonate complexes of Pt and the alloying elements were used in conjunction with glacial acetic acid as a reducing agent. Surfactants for reverse micelle formation were selected from a variety of aliphatic acetic acid moieties with fluorinated aliphatic chains. A schematic of the process is shown in FIG. 13. Acetyl acetonate complexes were prepared for Pt as well as for the alloyed metals. These were then reduced using glacial acetic acid to form nanoparticles containing the Pt alloys. Surfactant was added to the nanoparticles to form a colloidal sol, with the Pt alloy nanoparticles coated with surfactant in solvent. Once the catalyst nanoparticles were made, carbon was added to the micellar solution to pick up the encapsulated metal. The catalyst was then dried and fabricated into an electrode and membrane electrode assembly (MEA) using standard procedures. The encapsulation of the metal catalyst, with possible electrically insulating effect, was found not to be detrimental to the overall steady state performance of the catalyst. Rotating disc electrode (RDE) measurements in 1M Triflic acid were performed as well as conventional phosphoric acid fuel cell testing (see Examples 9-11).

Example 9

ORR Kinetics on Modified Pt Alloy Surfaces

Figure 15:
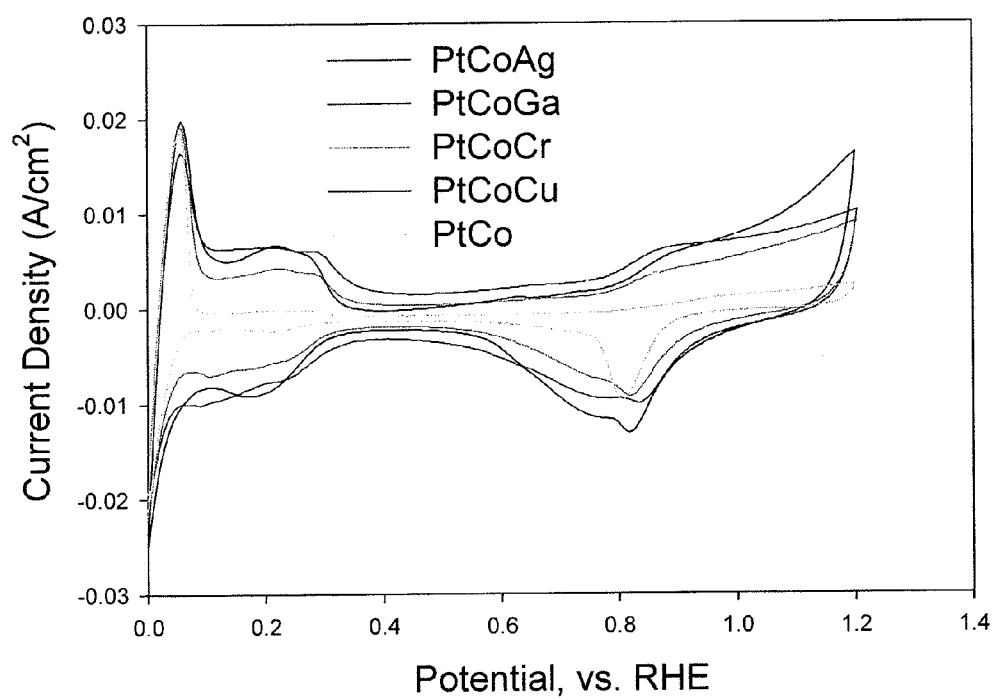
FIG. 15 shows results of cyclic voltammetry performed using the indicated platinum alloy catalysts in a phosphoric acid fuel cell at 150° C.

FIG. 15 shows cyclic voltammograms measured in a phosphoric acid fuel cell at 150° C. using a Pt reference electrode on the counter electrode side where $H_2$ flow was maintained. The Pt catalyst, prepared as described in Example 8, was a ternary alloy having a Pt outer skin with an alloy inner core. The cyclic voltammograms have primarily one distinguishing characteristic, which is related to the peaks for anodic oxidation of water. Comparison of the nature of the inflections in the cyclic voltammograms shows that the ternary alloys have a widely varying response towards the anodic reaction. The data for PtCo/C as described earlier are also shown for comparison. When compared to a PtCo/C alloy sample (washed), all the washed samples of the ternary alloys show some degree of Pt oxide formation. However among the ternaries compared in FIG. 15, PtCoCr shows the lowest inflection. The highest is shown by PtCoGa and the PtCoCu samples. These results are surprising, as earlier studies assumed the absence of these anodic inflection peaks to indicate that lower affinity for oxidation of water resulted from the level of perturbation of the Pt electronic states. Hence the charge transfer resulting from alloy formation which caused elevated d-band vacancy on the Pt was related to the observed phenomenon. However, in the case of the Pt alloys the use of other alloying elements in conjunction with Co somehow reverses the trend.

Figure 16:
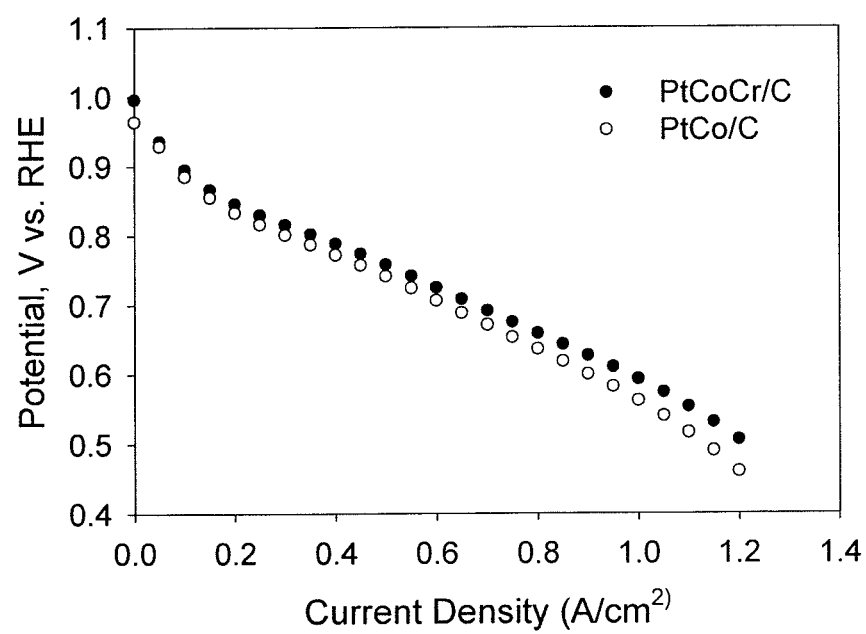
FIG. 16 shows results of steady state voltammetry using the indicated platinum alloy catalysts in a phosphoric acid fuel cell at 150° C.

The steady state fuel cell performance of the ternary alloys was measured at 150° C. under fully humidified conditions using air (approximately 2 times stoichiometric flow based on 1 A/cm$^2$) with hydrogen as the anode gas. As evident from the data in FIG. 16, the ternary alloy performed close to or better than the PtCo/C. The ternary alloy performed well and its performance was comparable to the PtCo/C catalyst.

These data were obtained for electrocatalysts that employed 20% metal loading on carbon. With higher loading, such as ~40% metal on carbon, keeping the electrode loading at 0.4 mg/cm$^2$, further improved performance can be expected.

Example 10

Pt Catalyst Prepared by Micellar Routes

Figure 17:
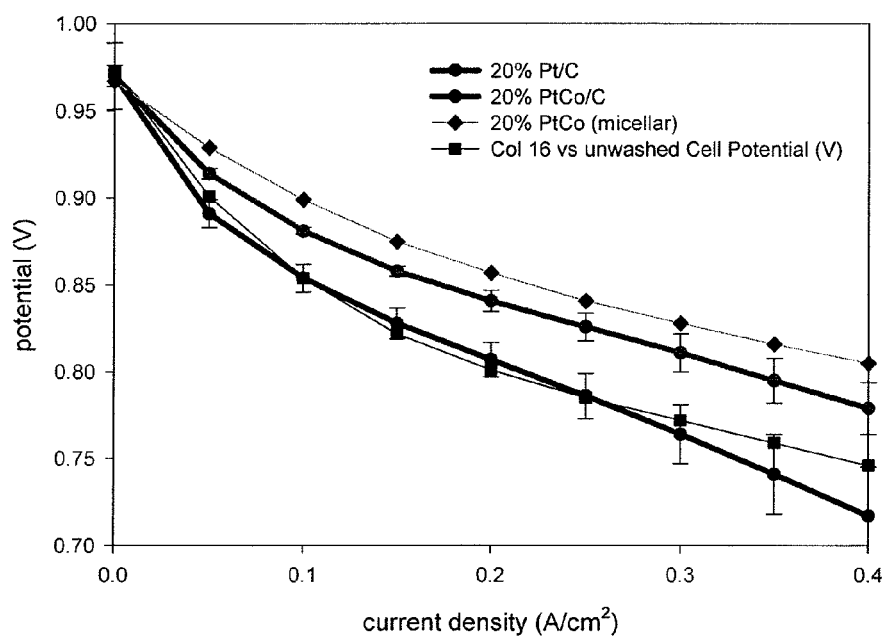
FIG. 17 shows results of steady state voltammetry using the indicated platinum alloy catalysts in a phosphoric acid fuel cell at 150° C. The performance of catalysts made by conventional carbothermic methods is compared with the performance of catalysts made by micellar methods.

FIG. 17 represents single cell phosphoric acid fuel cell data for Pt/C and PtCo/C, where a comparison is made between samples prepared using conventional carbothermic synthesis methodology (Pt/C) and the micellar methods (PtCo/C). For both methods, the nominal loading on the carbon support (Vulcan XC-72) was 20% and the electrode loading was maintained at 0.4 mg/cm$^2$. Performance was measured at 150° C., under fully humidified conditions with air (at approximately 2 times stoichiometry measured at 1 A/cm$^2$) and $H_2$. Error bars are shown for the conventional electrocatalyst's performance, providing a level of error inherent in these measurements. The data for the electrocatalyst prepared by the micellar route represent single experiments. The data in FIG. 17 demonstrate that the new micellar route for electrocatalyst synthesis provides significantly improved performance. The micellar synthetic route enables greater control of alloying composition, particle size, and the ability to encapsulate the nanoparticles.

Example 11

Micellar Catalyst Performance in Phosphoric Acid Fuel Cell

Figure 18:
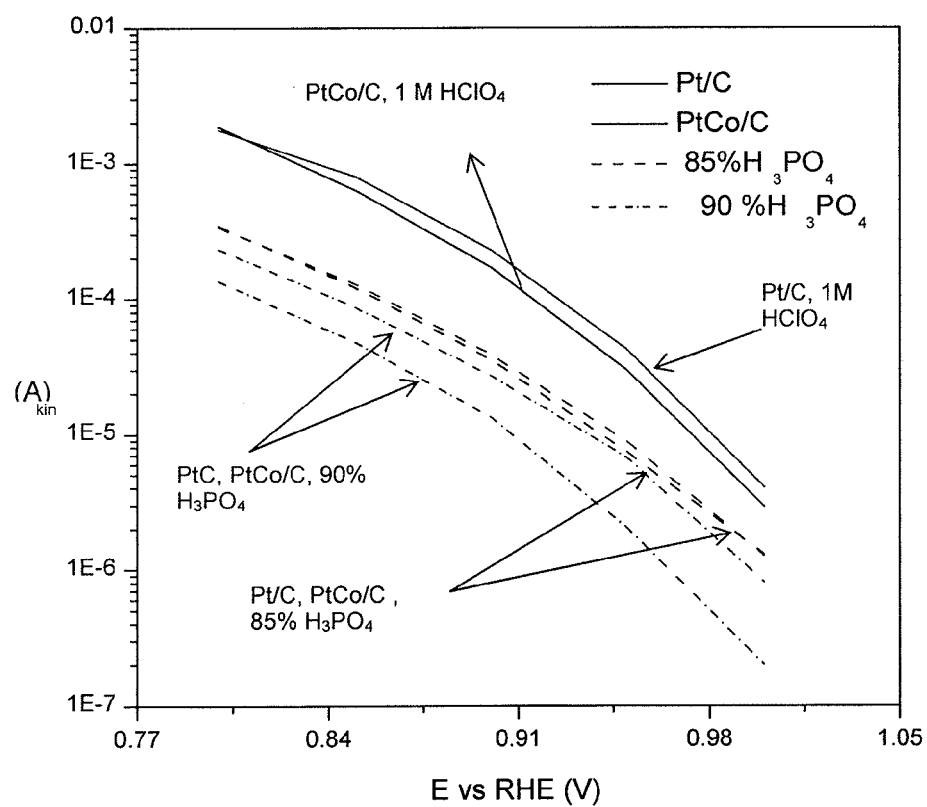
FIG. 18 shows the results of steady state voltammetry using the indicated platinum alloy catalysts in a phosphoric acid fuel cell at 150° C. The performance of a conventional catalyst (Pt/C) is compared with that of a catalyst made according to the micellar method (PtCo/C) using 1M perchloric acid electrolyte (upper two curves), as well as 90% and 85% phosphoric acid, as indicated.

FIG. 18 shows the kinetic current density as a function of cell potential for Pt/C (commercial) and PtCo/C (micellar method) catalysts in a phosphoric acid fuel cell at 150° C. The upper curves represent the performance using 1M perchloric acid as the electrolyte, while the lower curves were obtained using either 90% or 85% phosphoric acid as indicated.

TABLE 1

Composition of PtCo/C catalysts prepared using the microemulsion method

| Catalyst | Nominal composition | | Composition from ICP analysis | |
|---|---|---|---|---|
| | Pt Wt % | Pt:M (atomic) | Pt Wt % | Pt:M (atomic) |
| Pt/C (E-TEK) | 30 | — | 29.2 | — |
| Pt—Co/C—S | 26.4 | 67:33 | 22.4 | 79:21 |
| Pt—Co/C-T | 26.4 | 67:33 | 22.6 | 72:28 |
| Pt—Co/C-SB | 26.4 | 67:33 | 23.8 | 74:26 |
| Pt—Co/C-TB | 26.4 | 67:33 | 22.8 | 64:36 |

TABLE 2

XRD data of PtCo/C catalysts by the microemulsion method

| Catalyst | Lattice types | Pt (111) @2θ | Crystallite Size/nm | Lattice parameter/Å | Pt—Pt bond distance/Å | Degree of alloying (%)* |
|---|---|---|---|---|---|---|
| Pt/C (E-TEK) | fcc | 39.89 | 3.4 | 3.911 | 2.765 | 0 |
| Pt—Co/C—S | fcc | 40.33 | 3.9 | 3.870 | 2.737 | 71.9 |
| Pt—Co/C-T | fcc | 40.15 | 3.2 | 3.887 | 2.749 | 42.1 |
| Pt—Co/C-SB | fcc | 40.27 | 3.9 | 3.876 | 2.741 | 61.4 |
| Pt—Co/C-TB | fcc | 40.13 | 3.0 | 3.888 | 2.750 | 40.4 |
| Pt—Co/C-SH | fcc | 40.40 | 8.7 | 3.864 | 2.732 | 82.5 |
| Pt—Co/C-TH | fcc | 40.13 | 10.6 | 3.888 | 2.750 | 40.4 |

*degree of alloying was calculated from the expression: $\chi_a = (a - a_0)/(a_c - a_0)^{64}$

TABLE 3

Electrode kinetic parameters for different catalysts in 1M HClO$_4$ at room temperature. Scan rate 20 mV s$^{-1}$, rotation rate 1600 rpm

| Catalyst | ECA (m$^2$/g) | $E_{1/2}$ (V) | m | Mass Activity (mA/μg Pt) | | | Specific Activity (mA/cm$^2$) | | | Tafel slope (mV/decade) |
| | | | | @0.90 V | @0.85 V | @0.80 V | @0.90 V | @0.85 V | @0.80 V | |
|---|---|---|---|---|---|---|---|---|---|---|
| Pt/C (E-TEK) | 36.2 | 0.864 | 1 | 0.115 | 0.401 | 0.900 | 0.315 | 1.105 | 2.475 | 151/60 |
| Pt—Co/C—S | 23.6 | 0.876 | 1 | 0.154 | 0.640 | 1.645 | 0.583 | 2.715 | 6.980 | 137/55 |

TABLE 3-continued

Electrode kinetic parameters for different catalysts in 1M $HClO_4$ at room temperature.
Scan rate 20 mV s$^{-1}$, rotation rate 1600 rpm

| Catalyst | ECA ($m^2/g$) | $E_{1/2}$ (V) | m | Mass Activity (mA/μg Pt) @0.90 V | @0.85 V | @0.80 V | Specific Activity (mA/cm$^2$) @0.90 V | @0.85 V | @0.80 V | Tafel slope (mV/decade) |
|---|---|---|---|---|---|---|---|---|---|---|
| Pt—Co/C-T | 24.0 | 0.871 | 1 | 0.109 | 0.479 | 1.242 | 0.452 | 1.995 | 5.175 | 123/56 |
| Pt—Co/C-SB | 11.6 | 0.880 | 1 | 0.151 | 0.742 | 2.725 | 1.445 | 6.400 | 23.55 | 95/64 |
| Pt—Co/C-TB | 9.2 | 0.870 | 1 | 0.102 | 0.464 | 1.285 | 1.105 | 5.035 | 13.95 | 118/64 |
| Pt—Co/C-SH | 14.6 | 0.842 | 1 | 0.054 | 0.287 | 1.030 | 0.370 | 1.640 | 4.975 | 119/62 |
| Pt—Co/C-TH | 15.5 | 0.863 | 1 | 0.093 | 0.422 | 1.315 | 0.600 | 2.715 | 8.490 | 115/62 |

TABLE 4

Number of exchanged electrons and $H_2O_2$ yield for different catalysts in 1.0M $HClO_4$ at room temperature, scan rate 20 mV s$^{-1}$, rotation rate 900 rpm

| Catalyst | Number of Exchanged electrons | R value | % $H_2O_2$ [@0.6 V] | % $H_2O_2$ [@0.7 V] |
|---|---|---|---|---|
| Pt/C (E-TEK) | 3.7 | N/A | 1.18 | 0.699 |
| Pt—Co/C—S | 4.0 | 0.207 | 0.741 | 0.506 |
| Pt—Co/C-T | 3.8 | 0.167 | 0.618 | 0.448 |
| Pt—Co/C-SB | 3.5 | 0.251 | 1.42 | 0.972 |
| Pt—Co/C-TB | 3.7 | 0.207 | 1.23 | 0.797 |
| Pt—Co/C-SH | 3.9 | 0.211 | 0.878 | 0.451 |
| Pt—Co/C-TH | 3.8 | 0.231 | 0.954 | 0.480 |

While the present invention has been described in conjunction with certain preferred embodiments, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

References

1. W. Vielstich; A. Lamm; H. Gasteiger, *Handbook of Fuel Cells: Fundamentals, Technology, Applications*. Wiley: 2003; Vol. 2.
2. E. Antolini, Formation of carbon-supported PtM alloys for low temperature fuel cells: a review. *Mater. Chem. Phys* 2003, 78, 563-573.
3. E. Antolini; R. R. Passos; E. A. Ticianelli, Electrocatalysis of oxygen reduction on a carbon supported platinum/vanadium alloy in polymer electrolyte fuel cells. *Electrochim. Acta* 2002, 48 263-270.
4. H. Yang; W. Vogel; C. Lamy; N. Alonso-Vante, Structure and Electrocatalytic Activity of Carbon-Supported Pt—Ni Alloy Nanoparticles Toward the Oxygen Reduction Reaction. *J. Phys. Chem. B* 2004, 108, (30), 11024-11034.
5. J. R. C. Salgado; E. Antolini; E. R. Gonzalez, Carbon supported $Pt_{70}CO_{30}$ electrocatalyst prepared by the formic acid method for the oxygen reduction reaction in polymer electrolyte fuel cells. *J. Power. Sources* 2005, 141, 13-18.
6. L. Xiong; A. M. Kannan; A. Manthiram, Pt-M (M=Fe, Co, Ni and Cu) electrocatalysts synthesized by an aqueous route for proton exchange membrane fuel cells *Electrochem. Comm* 2002, 4, 898-903.
7. V. Raghuveer; P. J. Ferreira; A. Manthiram, Comparison of Pd—Co—Au electrocatalysts prepared by conventional borohydride and microemulsion methods for oxygen reduction in fuel cells. *Electrochem. Comm* 2006, 8, (5), 807-814
8. V. Stamenkovic'; T. J. Schmidt; P. N. Ross; N. M. Markovic, Surface Composition Effects in Electrocatalysis: Kinetics of Oxygen Reduction on Well-Defined Pt3Ni and Pt3Co Alloy Surfaces. *J. Phys. Chem. B* 2002, 106, 11970-11979.
9. G. Hoogers, *Catalysts for the Proton Exchange Membrane Fuel Cell*. CRC Press: 2003.
10. M. Neergat; A. K. Shukla; K. S. Gandhi, Platinum-based Alloys as oxygen—reduction Catalysts for Solid—Polymer—Electrolyte Direct Methanol Fuel Cells. *J. Appl. Electrochem.* 2001, 31, 373.
11. D. H. Chen; J. J. Yeh; T. C. Huang, Synthesis of Platinum Ultrafine Particles in AOT Reverse Micelles. *Journal of Colloid and Interface Science* 1999, 215, 159-166.
12. F. H. B. Lima; M. J. Giz; E. A. Ticianelli, Electrochemical Performance of Dispersed Pt-M (M=V, Cr and Co) Nanoparticles for the Oxygen Reduction Electrocatalysis. *J. Braz. Chem. Soc.* 2005, 16, (3A), 328-336.
13. T. Toda; H. Igarashi; H. Uchida; M. Watanabe, Enhancement of the Electroreduction of Oxygen on Pt Alloys with Fe, Ni, and Co. *J. Electrochem. Soc.* 1999, 146 (10), 3750-3756
14. J. R. C. Salgado; E. Antolini; E. R. Gonzalez, Preparation of Pt—Co/C electrocatalysts by reduction with borohydride in acid and alkaline media: the effect on the performance of the catalyst. *J. Power Sources* 2004 138 56-60.
15. U. A. Paulus; A. Wokaun; G. G. Scherer; T. J. Schmidt; V. Stamenkovic; N. M. Markovic; P. N. Ross, Oxygen reduction on high surface area Pt-based alloy catalysts in comparison to well defined smooth bulk alloy electrodes. *Electrochim. Acta* 2002, 47 3787-3798.
16. V. S. Murthi; R. C. Urian; S. Mukerjee, Oxygen Reduction Kinetics in Low and Medium Temperature Acid Environment: Correlation of Water Activation and Surface Properties in Supported Pt and Pt Alloy Electrocatalysts. *J. Phys. Chem. B* 2004, 108, 11011-11023.
17. Mukerjee, S. Platinum and platinum alloy electrocatalysts for oxygen electrodes in proton exchange membrane fuel cells: electrochemical and X-ray absorption spectroscopic investigation. 1994.
18. Mukerjee, S.; Srinivasan, S.; Soriaga, M. P.; McBreen, J., Role of Structural and Electronic Properties of Pt and Pt Alloys on Electrocatalysis of Oxygen Reduction: an In-situ XANES and EXAFS Investigation. *J. Electrochem. Soc.* 1995, 142, 1409.
19. Mukerjee, S.; Srinivasan, S.; Soriaga, M. P., Role of structural and electronic properties of Pt and Pt alloys on electrocatalysis of oxygen reduction. An in situ XANES and EXAFS investigation. *J. Electrochem. Soc.* 1995, 142, (5), 1409-22.
20. Adzic, R. R., In *Electrocatalysis*, Lipkowski, J.; Ross, P. N., Eds. Wiley-VCH: 1998; p 197.
21. Mukerjee, S., In situ *X-ray Absorption Spectroscopy of Carbon Supported Pt and Pt Alloy Electrocatalysts: Cor-* relation of Electrocatalytic Activity with Particle Size and Alloying. Marcel Dekker: 2003; p 501.
22. Tamizmani, G.; Capuano, G. A., Journal of the Electrochemical Society 1994, 141, 968.
23. Gamurzev, S.; Velev, O.; Srinivasan, S.; Appleby, A. J.; Luczak, F. J.; Wheeler, D. In 1997; The Electrochemical Society: 1997; p 626.
24. Murthi, V. S.; Urian, R. C.; Mukerjee, S., Oxygen Reduction Kinetics in Low and Medium Temperature Acid Environment: Correlation of Water Activation and Surface Properties in Supported Pt and Pt Alloy Electrocatalysts. Journal of Physical Chemistry B 2004, 108, (30), 11011-11023.
25. Anderson, A. B.; Rogues, J.; Mukerjee, S.; Murthi, V. S.; Markovic, N. M.; Stamenovic, V., Activation Energies for Oxygen Reduction on Platinum Alloys: Theory and Experiment. J. Phys. Chem. 2004, (In Press).
26. M. Inaba, Degradation Mechanism of Polymer Electrolyte Fuel Cells. 14th International Conference on the Properties of Water and Steam in Kyoto 2004, 395-402.
27. Q. Guo; P. N. Pintauro; H. Tang; S. O'Connor, Sulfonated and crosslinked polyphosphazene-based proton-exchange membranes. J. Memb. Sci 1999, 154 175-181.
28. A. E. Giannakas; A. K. Ladavos; P. J. Pomonis, Preparation, characterization and investigation of catalytic activity for NO+CO reaction of LaMnO3 and LaFeO3 perovskites prepared via microemulsion method. Appl. Catal. B 2004, 49, (3), 147-158.
29. H. Boennemann; W. Brijoux; R. Brinkmann; R. Fretzen; T. Joussen; R. Koeppler; B. Korall; P. Neiteler, Preparation, characterization, and application of fine metal particles and metal colloids using hydrotriorganoborates. J. Mol. Catal. 1994, 86, (1-3), 129-177.
30. M.-L. Wu; D.-H. Chen; T.-C. Huang, Synthesis of Au/Pd Bimetallic Nanoparticles in Reverse Micelles. Langmuir 2001, 17, (13), 3877-3883.
31. H. H. Ingelsten; R. Bagwe; A. Palmqvist; M. Skoglundh; C. Svanberg; K. Holmberg; D. O, Shah, Kinetics of the Formation of Nano-Sized Platinum Particles in Water-in-Oil Microemulsions. Journal of Colloid and Interface Science 2001, 241, 104-111.
32. M. Pileni, Water in oil colloidal droplets used as microreactors Adv. Colloid Interface Sci. 1993, 46, 139-163.
33. L. Xiong; A. Manthiram, Nanostructured Pt-M/C (M=Fe and Co) catalysts prepared by a microemulsion method for oxygen reduction in proton exchange membrane fuel cells. Electrochim Acta 2005, 50, 2323-2329.
34. Qian. Y; Wen. W; Adcock. P. A; Jiang. Z; Hakim. N; Saha. M. S; Mukerjee. S, PtM/C Catalyst Prepared Using Reverse Micelle Method for Oxygen Reduction Reaction in PEM Fuel Cells J. Phys. Chem. C 2008, 112, (4), 1146-1157.
35. B. D. Cullity; S. R. Stock, Elements of x-ray diffraction 3ed.; Upper Saddle River: NJ Prentice Hall, 2001.
36. E. Higuchi; H. Uchida; M. Watanabe, Effect of loading level in platinum-dispersed carbon black electrocatalysts on oxygen reduction activity evaluated by rotating disk electrode. J. Electroanal. Chem. 2005, 583, 69-76.
37. S. L. Gojkovic; S. Gupta; R. F. Savinell, Heat-treated iron(III) tetramethoxyhenyl porphyrin chloride supported on high-area carbon as an electrocatalyst for oxygen reduction: Part III. Detection of hydrogen-peroxide during oxygen reduction. Electrochim. Acta 1999, 45, 889-897.
38. Q. He; L. Sun; S. Mukerjee, Electrocatalysis of Oxygen Reduction on Carbon Supported Pt and PtCo Catalysts Prepared by Water-in-Oil Microemulsions. Submitted.
39. B. Shelimov; J.-F. Lambert; M. Che; B. Didillon, Initial Steps of the Alumina-Supported Platinum Catalyst Preparation: A Molecular Study by [195]Pt NMR, UV-Visible, EXAFS, and Raman Spectroscopy. J. Catal. 1999, 185, 462-478.
40. P. D. I. Fletcher; A. M. Howe; B. H. Robinson, The Kinetics of Solubilisate Exchange between Water proplets of a Water-in-oil Microemulsion. J. Chem. Soc., Faraday Trans. I 1987, 83, 985-1006.
41. A. S. Arica; V. Antonucci; N. Giordano; A. K. Shukla; M. K. Ravikumar; A. Roy; S. R. Barman; D. D. Sarma, Methanol oxidation on carbon-supported platinum-tin electrodes in sulfuric acid. J. Power Sources 1994, 50, 295-309.
42. S. Mukerjee; S. Srinivasan; M. P. Soriaga; J. McBreen, Role of structural and electronic properties of Pt and Pt alloys on electrocatalysis of oxygen reduction, an in situ XANES and EXAFS investigation. J. Electrochem. Soc. 1995, 142, (5), 1409-1422.
43. C. H. Chen; B. J. Hwang; G. R. Wang; L. S. Sarma; M. T. Tang; D. G. Liu; J. F. Lee, Nucleation and Growth Mechanism of Pd/Pt Bimetallic Clusters in Sodium Bis(2-ethylhexyl)sulfosuccinate (AOT) Reverse Micelles as Studied by in Situ X-ray Absorption Spectroscopy. J. Phys. Chem. B 2005, 109, 21566-21575.
44. A. R. West, Basic Solid State Chemistry. John Wiley & Sons: Chichester, 1988.
45. K. J. J. Mayrhofer; B. B Blizanac; M. Arenz; V. R. Stamenkovic; P. N. Ross; N. M. Markovic, The Impact of Geometric and Surface Electronic Properties of Pt-Catalysts on the Particle Size Effect in Electrocatalysis. J. Phys. Chem. B 2005, 109, 14433-14440.
46. A. Rose; E. M. Crabb; Y. Qian; M. K. Ravikumar; P. P. Wells; R. J. K. Wiltshire; J. Yao; R. Bilsborrow; F. Mosselmans; A. E. Russell, Potential dependence of segregation and surface alloy formation of a Ru modified carbon supported Pt catalyst. Electrochim Acta 2007, 52, 5556-5564.
47. Y. Takasu; N. Ohashi; X.-G. Zhang; Y. Murakami; H. Minagawa; S. Sato; K. Yahikozawa, Size Effects of Platinum Particles on the Electroreduction of Oxygen. Electrochim Acta 1996, 41, (16), 2595-2600.
48. H. R. Colón-Mercado; B. N. Popov, Stability of platinum based alloy cathode catalysts in PEM fuel cells. J. Power Sources 2006, 155, 253-263.
49. H. Xu; Y. Song; H. R. Kunz; J. M. Fentona, Effect of Elevated Temperature and Reduced Relative Humidity on ORR Kinetics for PEM Fuel Cells. J. Electrochem. Soc 2005, 152, (9), A 1828-A1836
50. N. M. Markovic; R. R. Adzic; B. D. Cahan; E. B. Yeager, Structural effects in electrocatalysis: oxygen reduction on platinum low index single-crystal surfaces in perchloric acid solutions. J. Electroanal. Chem. 1994, 377, 249-259.
51. M. T. Giacomini; E. A. Ticianelli; J. McBreen; M. Balasubramanianb, Oxygen Reduction on Supported Platinum/Polythiophene Electrocatalysts. J. Electrochem. Soc. 2001, 148 (4), A323-A329.
52. N. M. Markovic; T. J. Schmidt; V. Stamenkovic; P. N. Ross, Oxygen Reduction Reaction on Pt and Pt Bimetallic Surfaces: A Selective Review. Fuel Cells 2001, 1, (2), 105-116.
53. V. M. Jalan Noble metal/vanadium alloy catalyst and method for making. U.S. Pat. No. 4,202,934, 1980.
54. U. A. Paulus; A. Wokaun; G. G. Scherer; T. J. Schmidt; V. Stamenkovic; V. Radmilovic; N. M. Markovic; P. N. Ross, Oxygen Reduction on Carbon-Supported Pt—Ni and Pt—Co Alloy Catalysts. J. Phys. Chem. B 2002, 106, 4181-4191.

55. O. Antoine; R. Durand, RRDE study of oxygen reduction on Pt nanoparticles inside Nafion: $H_2O_2$ production in PEMFC cathode conditions. *J. Appl. Electrochem.* 2000, 30, 839-844.
56. C. F. Zinola; A. M. Castro Luna; W. E. Triaca; A. J. Arvia, Electroreduction of molecular oxygen on preferentially oriented platinum electrodes in acid solution. *J. Appl. Electrochem* 1994, 24, 119-125.
57. C. F. Zinola; W. E. Triaca; A. J. Arvia, Kinetics and mechanism of the oxygen electroreduction reaction on faceted platinum electrodes in trifluoromethanesulfonic acid solutions *J. Appl. Electrochem.* 1995, 25, 740-754.
58. S. Chen; A. Kucernak, Electrocatalysis under conditions of high mass transport rate: oxygen reduction on single submicrometer-sized Pt particles supported on carbon. *J. Phys. Chem. B* 2004, 108, 3262-3276.
59. Q. Zha, *Introduction of electrode kinetics.* 3 ed.; Science Press: Beijing, 2002.
60. Z. Sun; A. C. C. Tseung, Effect of Dissolved Iron on Oxygen Reduction at a Pt/C Electrode in Sulfuric Acid. *Electrochem. Solid-State Lett.* 2000, 3 (9), 413-415
61. Z. Sun; A. C. C. Tseung, Response to "Comment on 'Effect of Dissolved Iron on Oxygen Reduction at a Pt/C Electrode in Sulfuric Acid'" [Electrochem. Solid-State Lett., 3, 413 (2000)]. *Electrochem. Solid-State Lett.* 2001, 4, (3), L2-L2.
62. Z. Sun; H. C. Chiu; A. C. C. Tseung, Oxygen Reduction on Teflon Bonded $Pt/WO_3/C$ Electrode in Sulfuric Acid. *Electrochem. Solid-State Lett.* 2001, 4, (3), E9-E12
63. H. C. Chiu; A. C. C. Tseung, The Performance of a Pt/C Oxygen Electrode in the Presence of Dissolved Tungsten in Sulfuric Acid. *Electrochem. Solid-State Lett.* 1999, 2, (8), 379-381.
64. J. R. C. Salgado; E. Antolini; E. R. Gonzalez, Structure and Activity of Carbon-Supported Pt—Co Electrocatalysts for Oxygen Reduction. *J. Phys. Chem. B* 2004, 108, 17767-17774.

The invention claimed is:

1. A method of making a nanoparticulate platinum alloy catalyst, the method comprising the steps of:
    (a) providing a salt or complex of platinum and a salt or complex of a transition metal in an aqueous solution;
    (b) injecting an aliquot of the aqueous solution into a nonpolar solvent to form an emulsion;
    (c) adding a reducing agent to the emulsion, whereby the platinum and transition metal become reduced and form a colloidal sol comprising nanoparticles of platinum alloy;
    (d) adding a surfactant to the colloidal sol after step (c); whereby the surfactant encapsulates the nanoparticles;
    (e) adding particulate carbon to the colloidal sol after step (d); and
    (f) adding a polar solvent miscible with the nonpolar solvent, whereby the platinum alloy nanoparticles adhere to the carbon particles to form a nanoparticulate platinum alloy catalyst.
2. The method of claim 1, further comprising the step of:
    (g) replacing the nonpolar solvent with water by a solvent exchange process to produce an aqueous suspension of the catalyst.
3. The method of claim 2, further comprising the step of:
    (h) drying the aqueous suspension to produce a dry powder form of the catalyst.
4. The method of claim 3 further comprising the step of:
    (i) heating the dry catalyst.
5. The method of claim 1, wherein the transition metal is selected from the group consisting of cobalt, nickel, chromium, vanadium, manganese, iron, and mixtures thereof.
6. The method of claim 1, wherein the platinum complex is a platinum acetyl acetonate complex.
7. The method of claim 1, wherein the reducing agent is glacial acetic acid.
8. The method of claim 1, wherein the surfactant is a fluorinated aliphatic acetic acid moiety.
9. The method of claim 1, wherein 2 or more surfactants are added in step (d).
10. The method of claim 1, wherein the average size of the nanoparticulate platinum alloy is from about 1 to about 10 nm.
11. The method of claim 1, wherein the average size of the carbon particles is from about 50 to about 100 nm.
12. The method of claim 1, wherein the carbon particles are Ketjen carbon particles.
13. The method of claim 1, wherein the nonpolar solvent is cyclohexane and the polar solvent is acetone.
14. The method of claim 1, wherein two or more transition metals are used.
15. The method of claim 1, wherein the nanoparticulate platinum alloy is in the form of substantially monodisperse crystallites after step (f).
16. The method of claim 15, wherein the crystallites have an average size of less than 5 nm.
17. The method of claim 1, wherein the catalyst formed in (f) is resistant to poisoning in the presence of phosphate anion.

* * * * *